March 3, 1970 P. EPPENBERGER 3,498,020
SACK-FILLING EQUIPMENT

Filed March 19, 1968 17 Sheets-Sheet 1

INVENTOR.
PAUL EPPENBERGER
BY

INVENTOR.
PAUL EPPENBERGER

March 3, 1970     P. EPPENBERGER     3,498,020
SACK-FILLING EQUIPMENT
Filed March 19, 1968     17 Sheets-Sheet 5
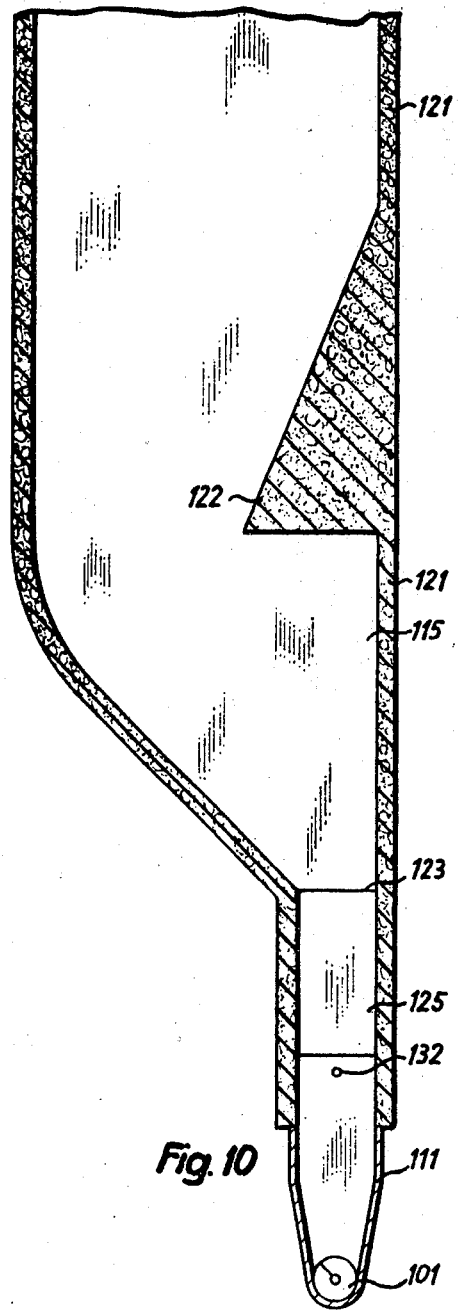
Fig. 10
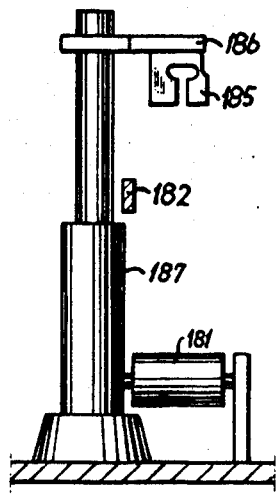
Fig. 11
Fig. 6
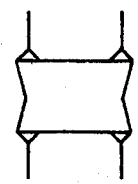
Fig. 7
INVENTOR.
PAUL EPPENBERGER
BY *MacGlew and Toren*
*attorneys*

March 3, 1970 P. EPPENBERGER 3,498,020
SACK-FILLING EQUIPMENT
Filed March 19, 1968 17 Sheets-Sheet 6

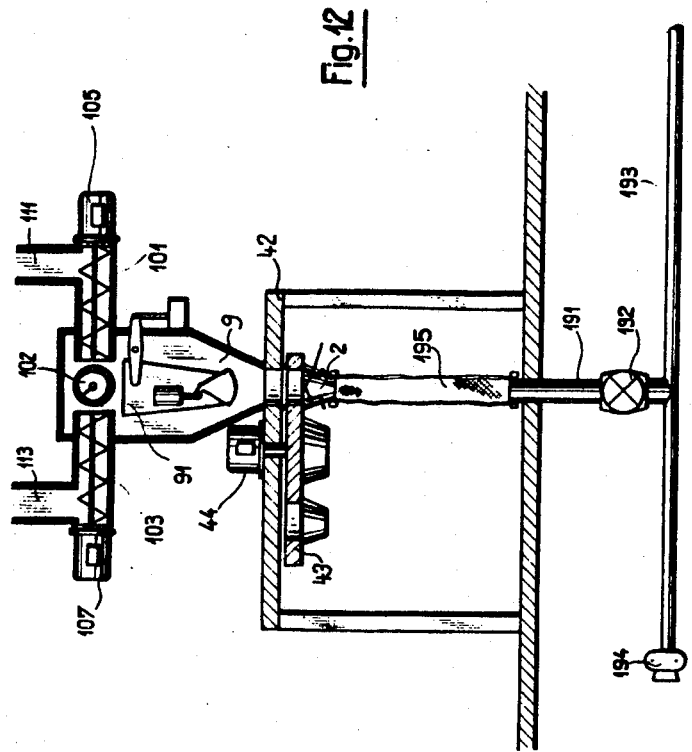

March 3, 1970 — P. EPPENBERGER — 3,498,020
SACK-FILLING EQUIPMENT

Filed March 19, 1968 — 17 Sheets-Sheet 9

March 3, 1970 P. EPPENBERGER 3,498,020
SACK-FILLING EQUIPMENT
Filed March 19, 1968 17 Sheets-Sheet 10

March 3, 1970 P. EPPENBERGER 3,498,020
SACK-FILLING EQUIPMENT
Filed March 19, 1968 17 Sheets-Sheet 13
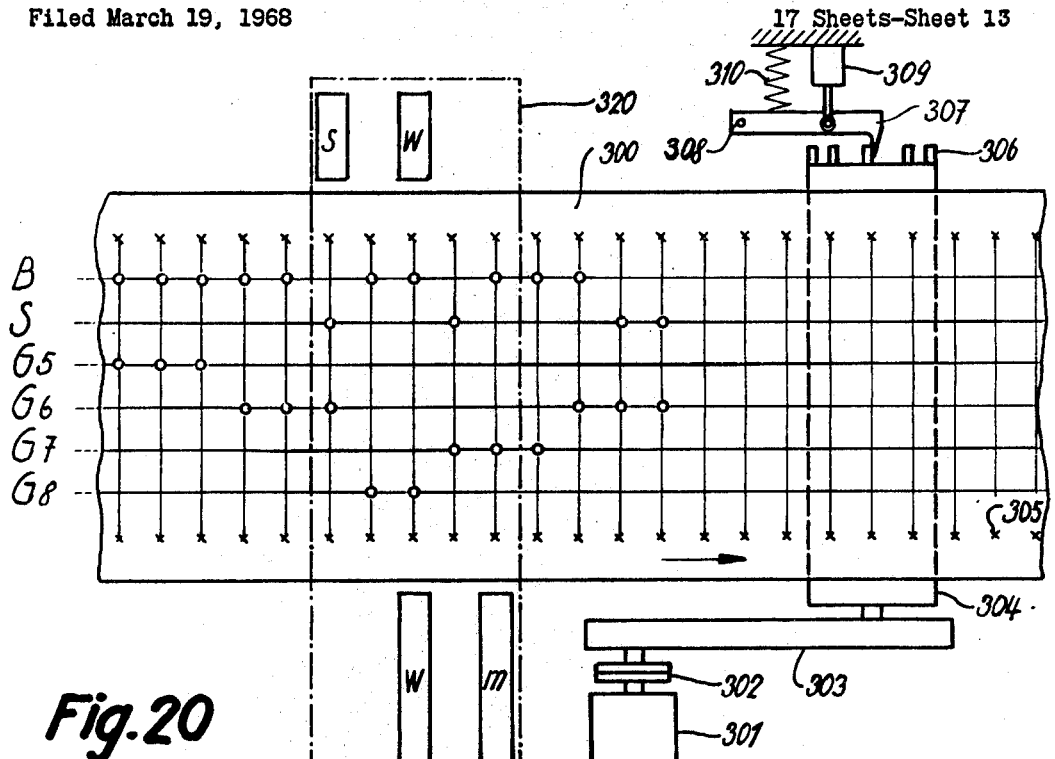
Fig.20
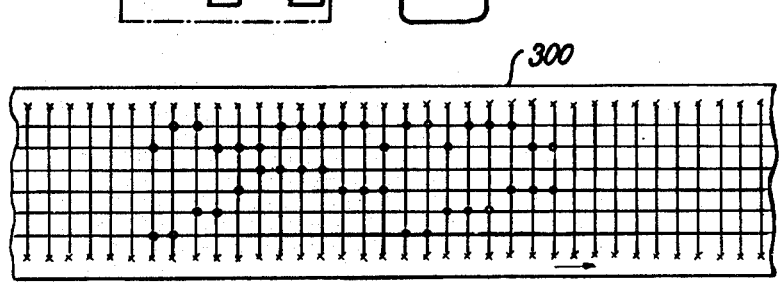
Fig.22
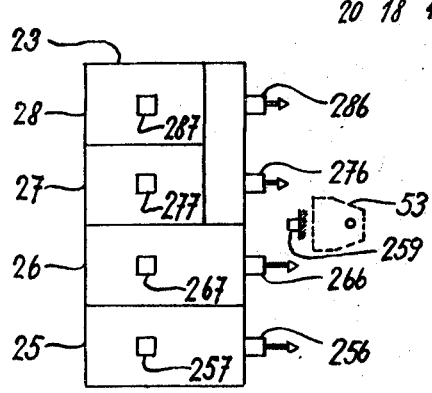
Fig.19
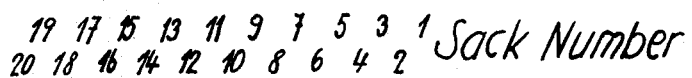
Sack Number
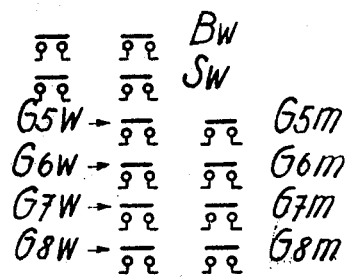
Fig.21

United States Patent Office 3,498,020
Patented Mar. 3, 1970

3,498,020
SACK-FILLING EQUIPMENT
Paul Eppenberger, Auenhofen, Switzerland, assignor to Gebruder Buhler AG, Uzwil, Switzerland
Continuation-in-part of application Ser. No. 392,727, Aug. 28, 1964. This application Mar. 19, 1968, Ser. No. 714,259
Claims priority, application Switzerland, Sept. 3, 1963, 10,883/63
Int. Cl. B65b 1/32, 43/50, 65/08
U.S. Cl. 53—55                                     16 Claims

ABSTRACT OF THE DISCLOSURE

Equipment for filling sacks with material of a powdery nature includes a multi-station, carousel-type, sack holding and filling means, weighing means above the sack filling means discharging metered quantities of material directly into a sack on the filling apparatus at a filling station, plural silo compartments, respective feeding mechanisms for each compartment selectively operable to feed material from the respective compartment directly to the weighing means, automatic selecting means operable to stop operation of an activated feeding mechanism upon completion of delivery of a predetermined number of charges of equal weight to the bag filling apparatus and to activate another feeding mechanism, bag marking mechanism, and a central control means controlling the operation of the entire sack filling equipment responsive to control signals from the control means. The control means is preferably controlled by a punched tape mechanism.

CROSS REFERENCE TO RELATED APPLICATION

This application is a continuation-in-part of copending application Ser. No. 392,727, filed Aug. 28, 1964, now abandoned, for "Sack-Filling Equipment."

BACKGROUND OF THE INVENTION

In industries producing bulk materials of various kinds and packing the material into sacks or bag, special problems arise when it is necessary to dispatch one or more lots or consignments of sacks or bags containing dissimilar materials. In large flour mills, for example, packaging of the materials or products usually is effected during relatively long periods and in a regular rhythm. Dispatching of the materials or products, however, takes place in lots, and by various means of transport, such as by rail, by road, or by ship. In order to avoid any unnecessary waste of time in shipping the goods or products, it is important that loading, for dispatch and transport, can be effected very rapidly.

An inconvenience arises in that dispatched loads are seldom homogeneous, but rather are composed of sacks or bags containing dissimilar kinds, types, or grades of materials or products, in addition to which the order of succession of loading and unloading has to be taken into consideration.

It has been impossible, hitherto, to control the bag or sack filling equipment in accordance with the order of succession for shipments, since the filling equipment includes a silo which has to be emptied before it can be used for packaging another product or material. Such changes usually require up to twenty minutes. Assuming a packing or packaging rate of six hundred 100 pound bags per hour, which may be easily attained, and a loading capacity of 100 bags per motor truck, the efficiency in shipping consignments consisting of a plurality of relatively small lots may be considerably reduced. For this reason, each product or material is usually packed separately over a longer period, and the bags are stored individually, or on so-called pallets, in special storage rooms. To compile a car-load consignment, the bags have to be fetched from the store-room, and this procedure requires a numerous handling crew.

In very large flour mills, separate silos, having their own bag or sack filling machines for each individual product or material, are usually available. In spite of the considerable investments thereby involved, consignments cannot be compiled automatically and sufficient storage facility for filled sacks or bags are still required.

In attempts undertaken to solve the problems mentioned above, preference is presently given to the storage of filled sacks or bags in a silo having groups of storage chutes. A large quantity of a material or product can be sacked by a bag or sack filling machine, and groups of chutes can be loaded with the filled sacks or bags. The chutes are provided with means for delivering the sacks or bags to a common belt conveyor, thereby enabling individual consignments, consisting of a plurality of different products or material, to be compiled automatically. Such bag silos, however, require a great deal of space, since the individual chutes cannot always be kept completely filled.

SUMMARY OF THE INVENTION

This invention relates to equipment for filling sacks and bags with material of a powdery or pulverulent nature and, more particularly, to an improved sack and bag filling equipment free of disadvantages of the prior art and capable of automatically weighing charges of the material, filling each weighed charge into bags or sacks, and marking and closing the filled bags and sacks.

With these objectives in mind, the packaging equipment of the present invention comprises a bag or sack filling machine, a weighing apparatus disposed above the filling machine and a plurality of silo compartments. Each of the silo compartments has associated therewith a separate feeding mechanism adopted to deliver material therefrom to the weighing apparatus, and automatic control means is provided to stop the supply of material from one feeding mechanism, after a predetermined number of charges of equal weight have been delivered, and to effect supply of material by another feeding mechanism.

The invention equipment occupies the least possible space, since very little dead space is left in the silo compartments, and the latter can be refilled continuously or at short intervals. Additionally, since no intermediate bins are required, the equipment enables passing immediately from one grade of material to another, and enables compiling of consignments including, for example, various grades of flour or the like, in desired and predetermined numbers of bags or sacks and predetermined orders of succession.

As a feature of the invention, a plurality of feeding mechanism are associated with, and adopted to communicate with, one and the same weighing mechanism, so that only a single, or only a few, weighing mechanisms are required, whereby a reduction in the overall mechanical parts can be attained. Since the overall height of the filling hopper for a single weighing apparatus may be made smaller, the invention arrangement thus requires less space. A further reduction in space requirements may be achieved by providing a weighing apparatus designed for a smaller size of bag or sack, for example 100 pound bags instead of 200 pound bags, and including control means for filling a plurality, for example two, charges into bags of 200 pounds capacity.

As a further feature of the invention, a particularly convenient arrangement of the silo compartments, the feeding mechanism for the weighing apparatus and the delivery to the latter are provided. The mechanism feeding the weighing apparatus has only a dosing function, and is not directly concerned with the discharge of the silo compartments. Thus, proper and regular working conditions are easily attained.

The bag filling machine forming part of the packaging equipment of the invention can be of the well-known carousel-type, with means being provided to increase its capacity. By providing a plurality of weighing mechanisms, the number of silo compartments served simultaneously can be increased.

A further feature of the invention relates to a bag marking mechanism which may be included in the bag filling apparatus to provide the filled bags with indications relating to the material or product contained therein, and the provision of control means cooperating with the mechanisms feeding the weighing apparatus. In spite of its relative simplicity, this combination has never been proposed hitherto, and forms the actual key to fully automatic operation.

With respect to such automatic operation, the invention includes further appropriate means such as a bag filling apparatus in combination with a bag storage apparatus and a delivery mechanism including suitable means for appropriate coordination of their operation with mechanisms feeding the weighing apparatus. A centralized operation control system or arrangement, enabling determination of the number of charges, marking the bags and other functions which may be desired, provides for entirely automatic operation of the invention equipment. The centralized control system may be advantageously adopted for use with punched cards or tapes. In connection with the preparation of a consignment, one or more duplicate cards may be punched simultaneously and used to control the packaging equipment, and to establish the invoice, the delivery note, the bookkeeping and the stock keeping controls and the like.

When used as a flour silo, the capacity thereof can be increased by additional silo facilities connected by suitable conveyor means with the silo compartments associated with the mechanisms feeding the weighing apparatus. At the bottom of the filling apparatus, below the filling position, there is selectively provided a discharge spout comunicating with suitable conveyor means for withdrawing individual quantities, a suitable connecting tube being provided to be interposed between the discharge spout and the corrsponding bag filling spout.

Accordingly, an object of the invention is to provide a packaging equipment obviating the disadvantages of prior art packaging equipment.

Another object of the invention is to provide a packaging equipment which is compact in nature and require comparatively little space.

A further object of the invention is to provide a packaging equipment which is fully automatically controlled.

Yet, another object of the invention is to provide such a packaging equipment including a bag filling machine, a weighing apparatus disposed above the machine and a plurality of silo compartments.

A further object of the invention is to provide such a packing equipment in which the silo compartments have associated therewith separate feeding mechanisms adopted to deliver material therefrom to a weighing apparatus, and automatic control means for stopping the supply of material from one feeding mechanism after a predetermined number of charges of equal weight, and to change the supply to another feeding mechanism.

Still another object of the invention is to provide such a packaging equipment in which very little dead space is left in the silo compartments so that the latter can be refilled continuously or in short intervals, thus eliminating the necessity for intermediate bins and enabling immediate changeover from one grade of material to another in compiling consignments.

Another object of the invention is to provide such a packaging equipment including means for marking the filled sacks or bags with appropriate indications as to their contents.

A further object of the invention is to provide such a packaging equipment including a centralized operation control system controlling all the functions of the apparatus and operable by punched cards or punched tapes.

BRIEF DESCRIPTION OF THE DRAWINGS

For an understanding of the principles of the invention, reference is made to the following description of typical embodiments thereof as illustrated in the accompanying drawings.

In the drawings:

FIG. 6 is a sketch of an empty bag folded as supplied;

FIG. 7 is a sketch representing the opening of an empty bag;

FIG. 10 is a vertical sectional view through the lower part of a silo compartment taken substantially along and slightly the line X—X of FIG. 8;

FIG. 11 is a vertical sectional view of the bag sewing mechanism taken along the line XI—XI of FIG. 2;

FIG. 12 is a vertical sectional view, on a smaller scale, of a detail of the packaging equipment at the bag filling station;

FIG. 19 is a somewhat schematic block diagram illustrating the switch arrangement at a sack stacker;

FIG. 20 is a somewhat schematic plan view of a punched tape and associated apparatus useable with the invention;

FIG. 21 is a layout of the positional arrangements of the switch used with the mechanism shown in FIG. 20;

FIG. 22 is a plan view of the punched tape with the sack number indications.

DESCRIPTION OF THE PREFERRED EMBODIMENTS

Figure 1:
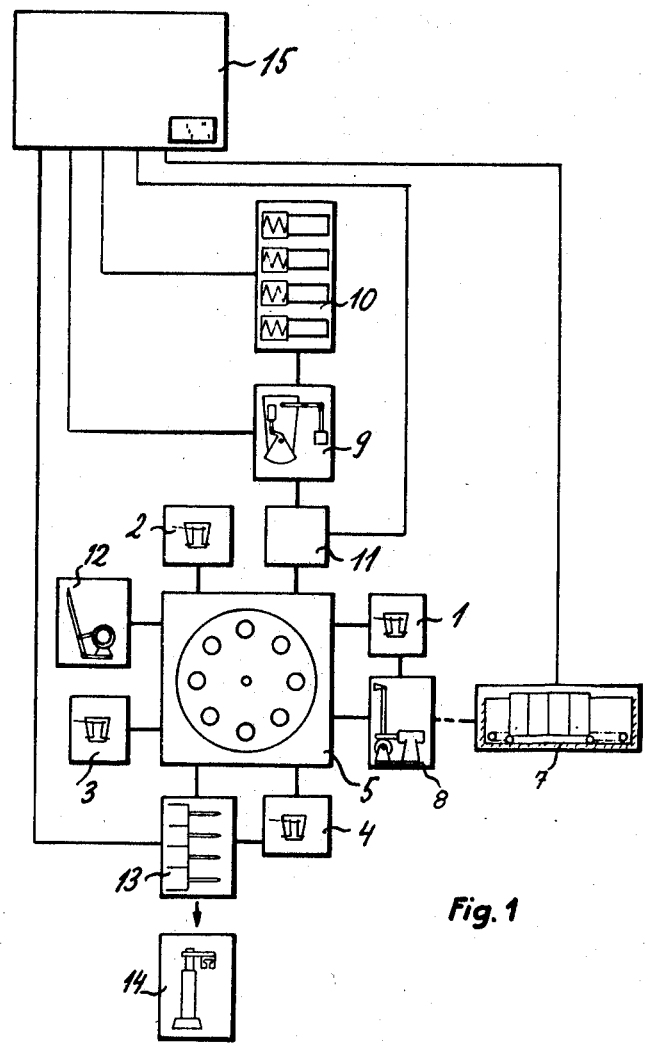
FIG. 1 is a block diagram of packaging equipment embodying the invention.

Referring now to the drawings in further detail the novel equipment is constituted broadly by various component units of mechanisms and apparatus as shown in FIG. 1 illustrating schematically their relationship in operation. Connections indicated by full thick lines signify control and interlocking systems. A thick dash line denotes an interlocking connection, while the thin lines symbolise pilot and/or signalling connections to and from a control center.

In a convenient embodiment, a bag or sack filling carousel includes four stations. The rotating portion carries four bag filling spouts disposed in the positions referred to in FIG. 1 by the reference numerals 1 to 4 and which are provided with bag clamping means. A bag or sack storage mechanism 7 communicates through a delivery mechanism 8 with the first carousel station to supply and suspend empty bags of sacks. The second station, being a bag filling station, communicates with a weighing mechanism 9 adjusted to a predetermined weight and fed preferably by a group 10 of feeding units delivering material to the weighing mechanisms 9, control means 11 being provided to release a predetermined number of charges from the weighing mechanism per each step of carousel 5. A bag compacting unit 12 is associated with the third station for compacting the bag contents. From the fourth station, the filled bags or sacks pass on to a bag marking device 13 and fiinally to a bag sealing mechanism 14, for example a sewing machine or the like.

A control center 15, which may conveniently include punched card, punched tape, or the like control means, transmits control signals to the bag storage means 7, the feeding mechanisms 10 of the weighing mechanism and the marking means 13, and in turn also receives confirmation signals from these units 7, 10, 13 upon completion of the various functions. From the weighing apparatus 9, the number of charges released is also transmitted to the control center 15, which thus controls the co-ordination of the different operations performed by the various mechanisms and apparatus.

The bag or stack storage unit 7, represented in detail in FIGS. 2 to 5, is conveniently disposed in a pit 21 and, broadly speaking, includes a carriage 23 provided with wheels 22 and one or more containers or compartments 25 to 28 and bag supporting tables 30 and lifting mechanisms 29 therefor disposed in each container or compartment. The compartments 25 and 26 are provided for bags or sacks 31 of a larger size, whereas smaller bags or sacks 32 are stored in the compartments 27 and 28. The position of the carriage 23, in which the desired bag compartment 25, 26, 27 or 28 communicates with the bag delivery mechanism 8 is adjusted by a motor 34 actuating a chain or the like drive 35 which in turn displaces carriage 23. The position of the uppermost bag of a pile is adjusted by the corresponding lifting device 29 under the influence of a suitable control device, for example, photoelectric cells, electric capacitance comparators or the like, as described hereinafter. A signal released by the punched card or tape control center 15 causes motor 34 to displace one of the compartments 25, 26, or 27, 28 into communicating relationship with the bag delivery mechanism 8. As soon as one of these compartments for example compartment 25, becomes empty before another signal requesting a change of the bag size is released by the control 15, carriage 23 automatically moves to a position wherein compartment 26 communicates with bag delivery mechanism 8, enabling the packing equipment to continue operation without interruption and compartment 25 to be refilled with a new pile of empty bags or sacks.

The carousel unit 5 comprises a frame structure 42, wherein a turntable 43 carrying bag filling spouts 1 to 4 is rotatably disposed. Turntable 43 is actuated by a motor 44. Bag delivery mechanism 8 includes a lifting arm 52 provided with suction cups or grippers 51 and pivotted on a rotatable supporting member 53 adapted to rotate about a vertical axis. The position of lifting arm 52 is adjustable about a horizontal axis by any suitable actuating mechnism 54, gear rack 55 and a gear 56.

Actuating mechanism 54 may be operable electrically, hydraulically, or pneumatically. The position of supporting member 53 is also adjustable about a vertical axis by a suitable actuating mechanism 58 of any kind, a gear rack 59 and a gear 60.

Below bag filling spout 1 of the bag mounting station, a U-shaped horizontal frame 62 is fixed, carrying four movable suction cups or grippers 64 which may be actuated by suitable actuating means 63. Another actuating mechanism 65 is also fixed on frame 62 by means of a crossbar 66, and a further actuating mechanism 67 is provided to move supporting frame 62 vertically. Two bag clamping members 71, 72 are pivotably mounted on pivots 73 disposed on the bag filling spouts. On either side of the bag filling spouts 1, 2, 3, 4, a toggle lever system consisting of a long link 74, extending outwardly to beyond the crossbar 66, and a short link 75 is pivotably mounted on the bag clamping members 71, 72. A stop member 76 limits the downward tilting movement of the toggle lever system as soon as it tilts out of the dead center. In its horizontal position, link 74 actuates a limit switch 77.

Figure 8:
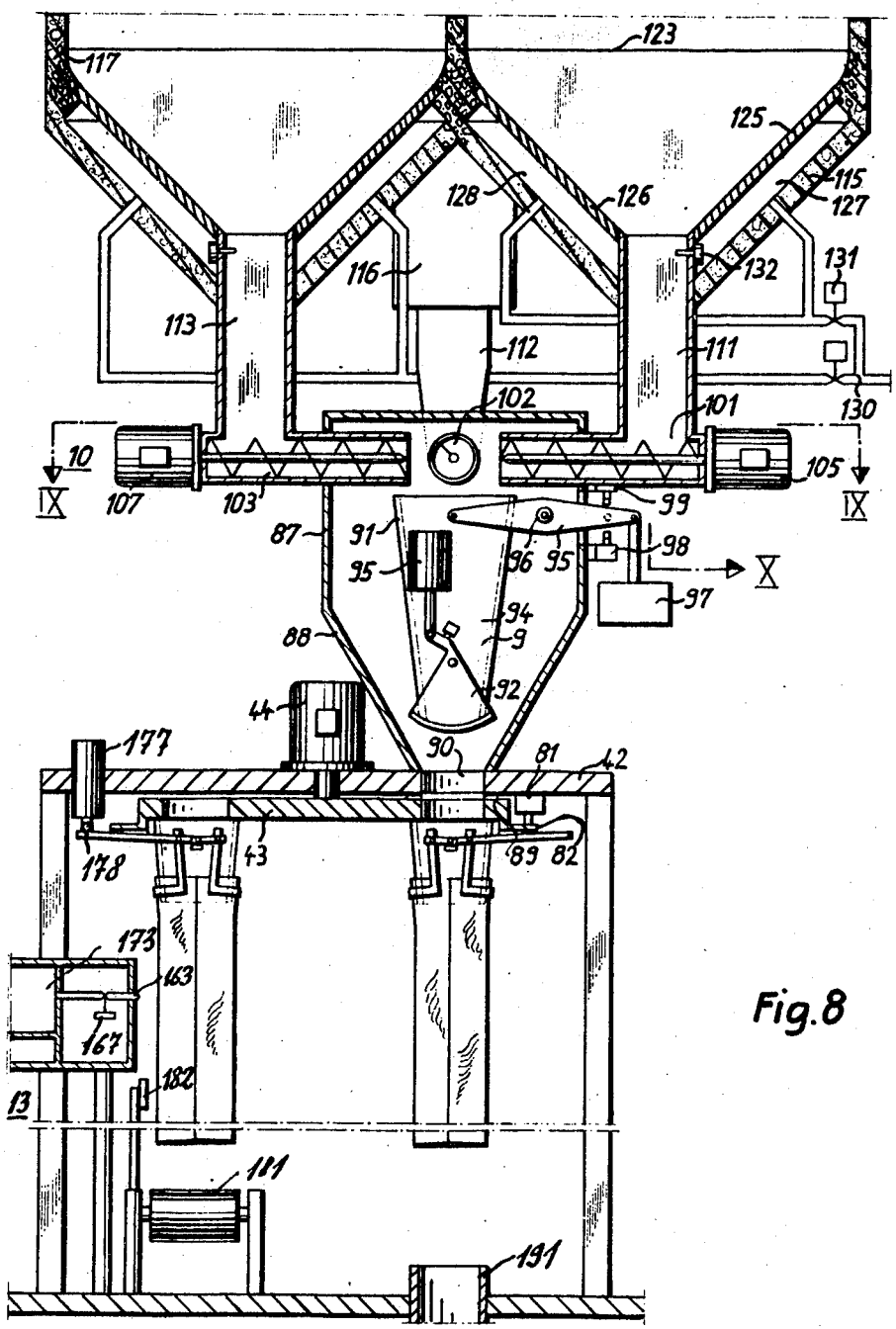
FIG. 8 is a vertical sectional view taken along the line VIII—VIII of FIGS. 9 and 3, representing the bags in the filling position and in the compacting position.
Figure 9:
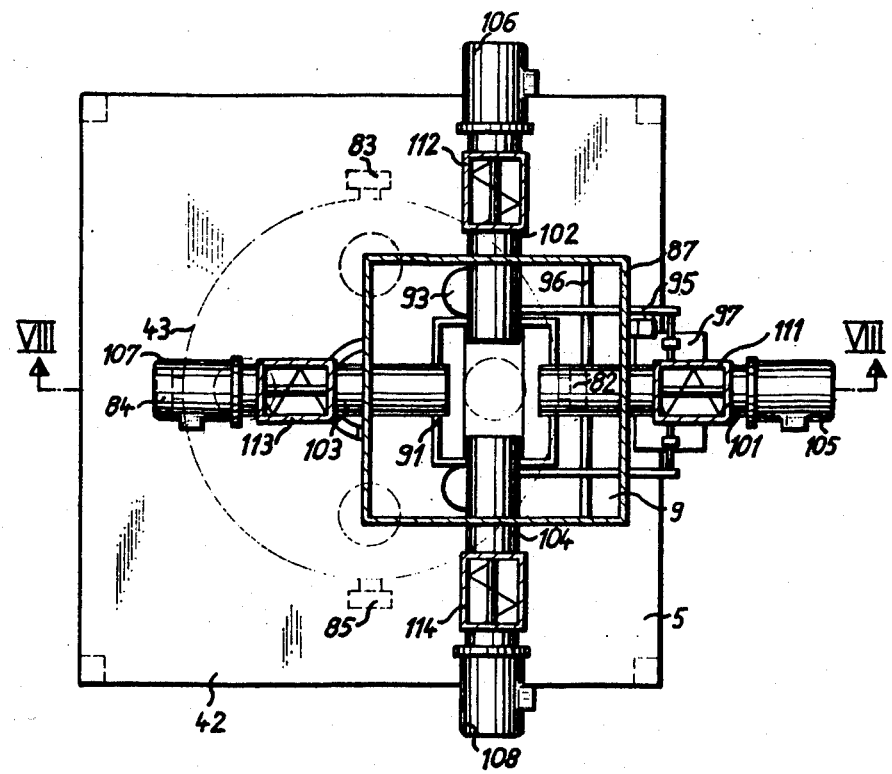
FIG. 9 is a horizontal sectional view taken along the line IX—IX of FIG. 8, with only the carousel disk represented below the frame.

At the bag filling station (FIGS. 8 to 10) another limit switch 81 is fixed on the frame structure 42 and adapted for actuation by operating fingers 82, 83, 84, 85 fixed to turntable 43. The weighing apparatus 9 is disposed in a housing whose lower portion forms a charging chute 88 which communicates, through an opening 90 in frame structure 42, with the bag filling spout in position 2, a sealing member 89 being interposed around the gap between passage 90 and the corresponding passage in turntable 43.

The weighing apparatus comprises a funnel-shaped weighing pan 91 having a discharge control gate 92 movably disposed at its lower end and actuated by an electromagnet 93 or the like. The weighing pan 91 is suspended at one end of a balance scale beam 95 having its center pivotably journaled in a bearing 96 and a counterweight 97 disposed at its other end. Two limit switches 98 and 99, defining the scale beam deviations for the empty and filled weighing pan 91, respectively, are fixed to the housing 87. It is of course, understood that the representation in the drawing is more or less schematized, so that the bearing 96, for example, really is a knife edge bearing. Instead of the limit switches 98, 99 fixed to the housing 87, mercury switches may be fixed on the balance beam 95. The weighing mechanism proper is generally well known in a variety of types and the representation in the drawing therefore is schematized.

The set 10 of weighing pan filling mechanisms, previously also termed feeding mechanisms, includes four units 101–104 consisting of conveying screws driven by geared motors 105–108. To each one of the worms 101–104 a second worm can be adapted for precision feeding to rated weight after pre-filling of the weighing pan to approximate weight. Such arrangements are also already known. Weighing pan feeding mechanisms 101–104 are connected by respective downpipes 111–114 with respective silo compartments, three silo compartments being referred to by reference numerals 115–117 in FIG. 8. The wall of silo compartment 115 is provided with an inwardly directed boss or wall projection 122 disposed in its lower portion above the outlet, as shown in FIG. 10, to relieve two porous floor plates 125, 126 disposed at the bottom and sloping towards the outlet of the compartment, thereby forming a chute which communicates with downpipe 111. Below sloping floor plates 125, 126, air chambers 127, 128 are disposed, which communicate with a conduit system 130 supplying compressed air. In the conduit system, a shut-off valve 131 is disposed and controlled, for example, by a capacitance responsive filling height detector 132. The other compartments are substantially similar.

At the station for compacting the bag contents (FIGS. 2, 3), the bag compacting unit 12 is provided with a tapper 151 actuated by a motor 152 and a crank mechanism 153 to perform a swinging movement about a fulcrum point 154.

At the fourth station, releasing the filled bags, the bag marking device 13 is disposed, which includes a suitable number, conveniently four, of spraying nozzles 161–164, which are controlled by valves 165–168 and communicate with respective containers 171–174 containing paint or marking ink of various colors and to which pressure is applied. An operating mechanism comprising, for example, an electromagnet 177 in combination with a crossbar 178 to actuate control link 74 of the bag filling spouts reaching the fourth or last carousel position, is appropriately fixed to the frame structure 42.

A conveyor mechanism 181 (FIG. 2), conveniently a belt-conveyor, which carries the filled bags to the bag sealing mechanism 14, begins below the bag filling spout at the fourth carousel station. Along the belt-conveyor 181, a barrier 182 is arranged. The sewing head 185 of the bag sewing apparatus 14 (FIG. 11) is fixed at one end of a crossarm 186 (FIG. 3) while the other end of this latter is fixed to a lifting mechanism 187, conveniently of a telescopic columnar type. Vertical adjustment of the lifting mechanism 187 with the sewing head 185 may take place by control means know per se and therefore not shown, for example of a photo-electric type or the like.

Below the bag filling spout situated in the carousel position 2, the bag filling station, another spout 191, communicating with a pneumatic conveyor conduit system 193 (FIG. 12) through a sluicing means 192, is disposed to enable compliation of loose consignments, by means of an interconnecting tube 195 selectively interposable between the bag filling spout and receiving spout 191 of pneumatic conveyor system 193.

Figure 2:
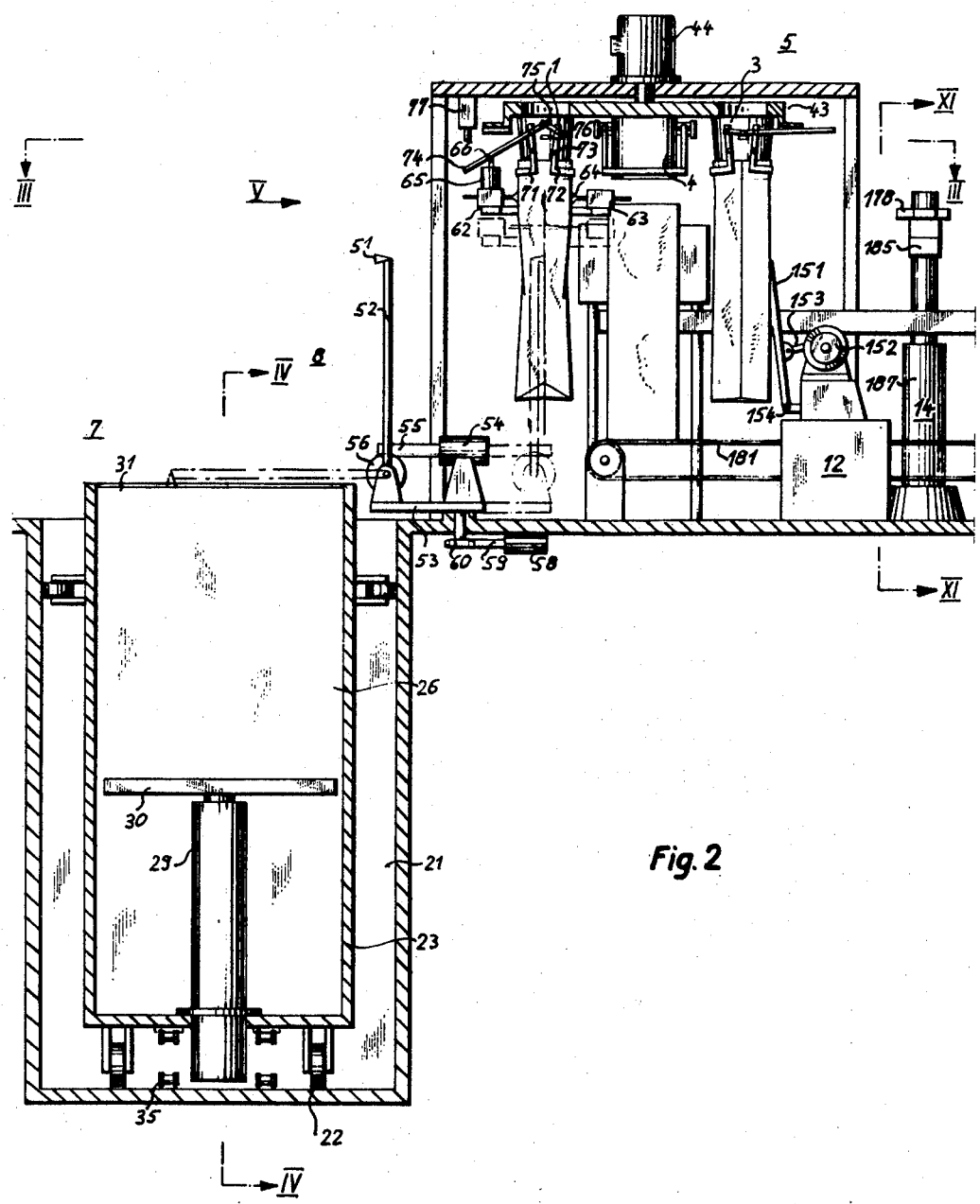
FIG. 2 is a partial longitudinal sectional view of the packaging equipment taken along the line II—II of FIG. 3.
Figure 3:
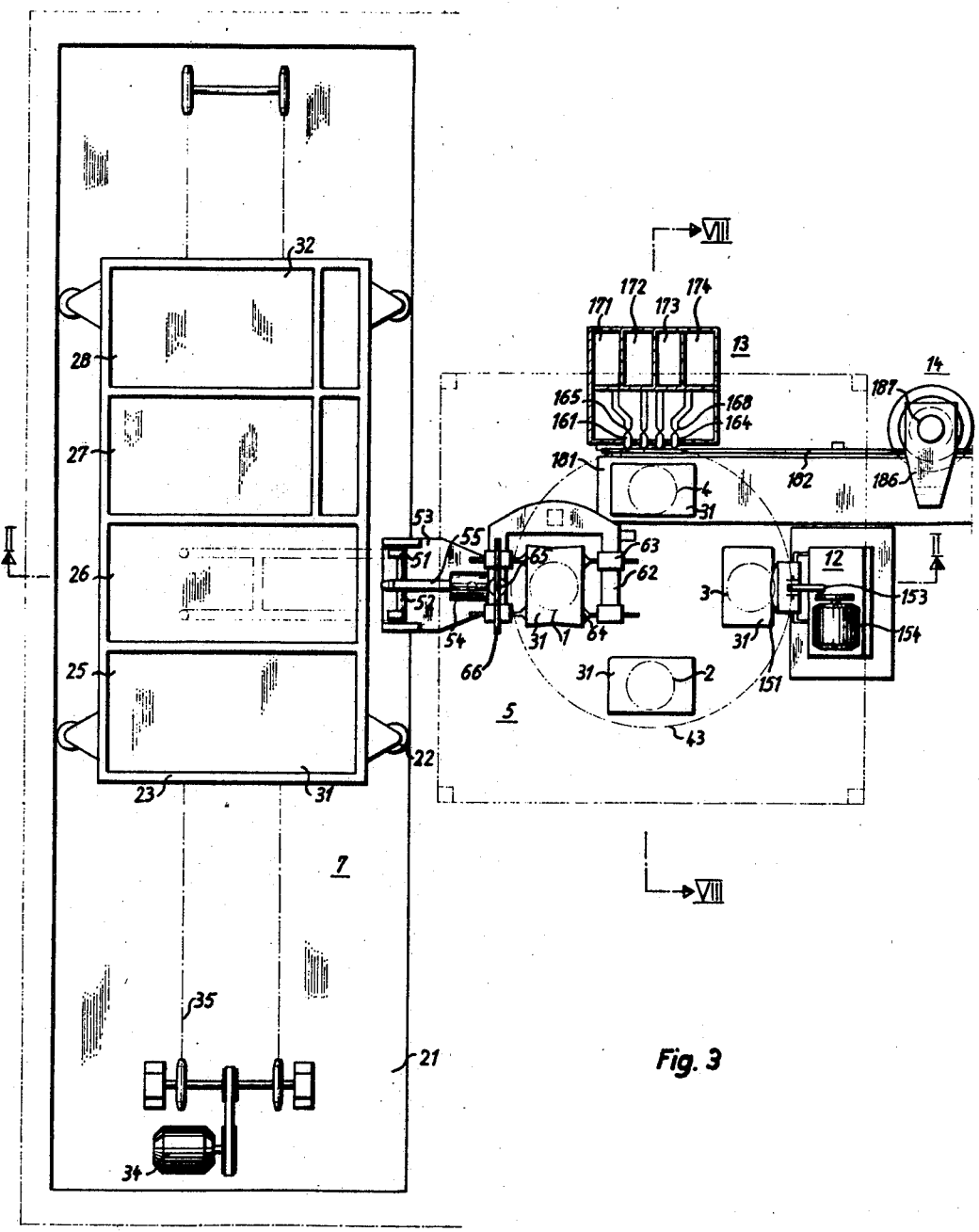
FIG. 3 is a plan view, in section, taken along the line III—III of FIG. 2.
Figure 4:
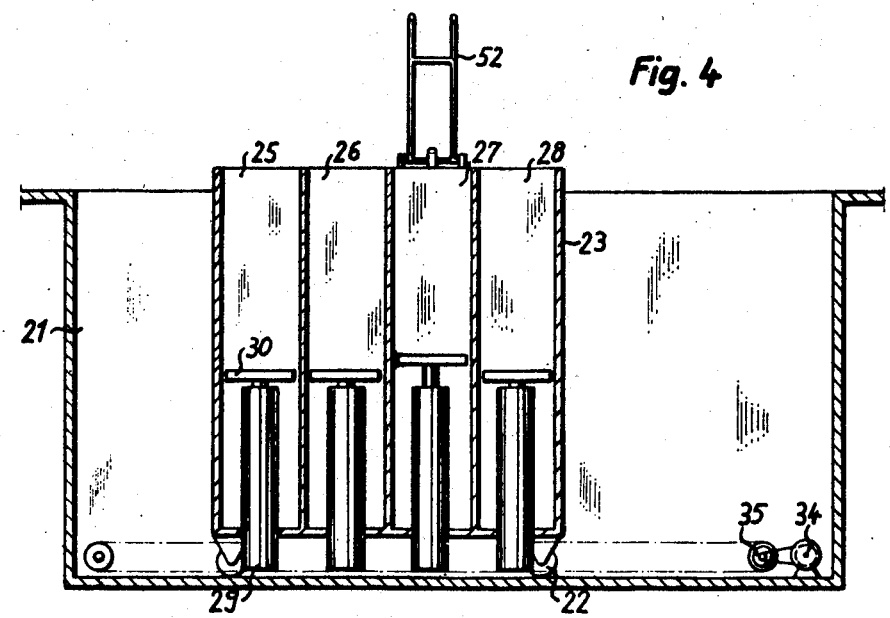
FIG. 4 is a vertical sectional view, on a smaller scale, taken along the line IV—IV of FIG. 2.
Figure 5:
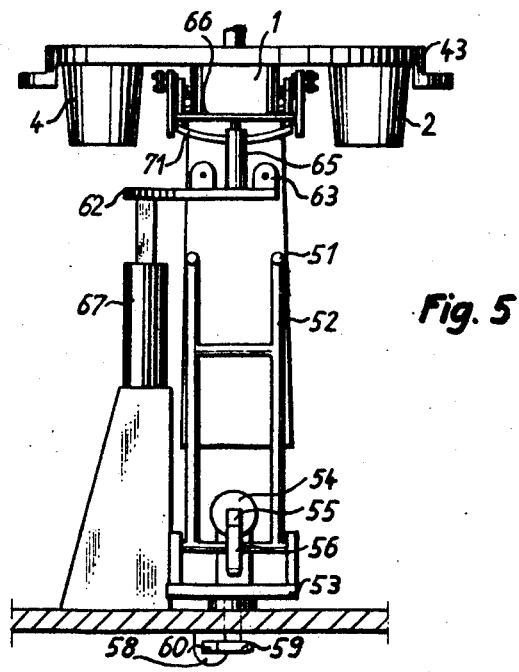
FIG. 5 is a detail of the packaging equipment as seen looking in the direction of the arrow V of FIG. 2.

As soon as bag delivery mechanism 8 has delivered an empty bag and has returned into the position shown in FIG. 2, the signal of control center 15, selecting the desired silo compartments 25, 26, or 27, 28, is confirmed, and when the bag detecting control device of bag storage mechanism 7 has ascertained that no bag storage compartment is empty, suction is applied at the suction grippers 51 and bag lifting arm 52 is lowered by its actuating mechanism 54 to seize the uppermost bag 31 in the bag storage compartment selected. Bag lifting arm 52, actuated by mechanism 54, then returns to vertical position with an empty bag and delivery mechanism 8 awaits the following step of the carousel 5, bringing an empty bag filling spout into carousel position 1. The locking mechanism cooperating with carousel 5 then releases the further movement of the bag delivery mechanism 8. Actuating mechanism 58 then rotates supporting structure 53 through approximately half a revolution to bring lifting arm 52 with the bag 31 through the open side of supporting frame 42 to a position below the bag filling spout 1 indicated in the drawing by dash-dot lines, but with suction grippers 64 in retracted position. Suction is then applied to grippers 64 and these are advanced to the bag 31. Suction for grippers 51 is then terminated, and actuating mechanism 58 returns rotatable supporting structure 53 to its original position. Upon a signal from control center 15, a new bag will be withdrawn from the bag storage apparatus.

Suction grippers 64 are then retracted, in turn, by electromagnets 63 to thereby open the empty bag, as represented diagrammatically in FIGS. 6 and 7. Supporting frame 62 together with the open bag is then lifted by actuating mechanism 67 to a position between the clamping members 71, 72 whereby the bag filling spout 1 projects into the open bag. Actuating mechanism 65 then tilts lever 74 upwardly by means of crossbar 66. Clamping of the bag onto the bag filling spout then takes place by means of the clamping members 71, 72, forming a toggle lever system in conjunction with links 74 and 75. The short arms of the toggle lever system being pressed down beyond the dead center position to butt against stop members 76, there is no danger of the longer links 74 dropping downwardly by their own weight. In the clamping position link 74 actuates limit switch 77, causing termination of suction for suction grippers 64 and lowering of frame 62 by mechanism 67, as well as retraction of crossbar 66 by mechanism 67.

A suitable supervising device, for example of some well known photo-electric type, now ascertains the presence of a fitted empty bag and thereupon causes the turntable of carousel 5 to proceed to the following position. After completion of the charge or charges required to fill a preceding bag, weighing pan 91 has returned upwardly and actuated limit switch 98, while discharge control gate 92 has meanwhile been closed by electromagnet 93, thereby simultaneously actuating limit switch 94 and effecting unlocking of the weighing pan feeding apparatus 10 comprising feeding units 101–104. The feeding unit selected by control center 15 after completion of the final charge of weighing apparatus 9, for example unit 101, will be driven by its own gear motor to fill weighing pan 91 with the desired product.

On completion of the preceding charge, weighing apparatus 9 has effected closure of the energizing circuit of motor 44 to rotate the turntable of carousel 5 to the following position, on condition, however, that the interlocking means of the other stations are unlocked. The bag filling spout represented in position 2 comes into communication with passage 90 in the frame. Operating finger 82 of turntable 43 actuates limit switch 81 to stop and lock the turntable in this position, whereas weighing pan gate 92 is unlocked and is ready to be opened as soon as the weighing pan is filled.

Under the weight of the filled weighing pan 91, scale beam 95 is tilted and actuates limit switch 99, stopping driving motor 101 and energizing electromagnets 93 to open gate 92. If a bag of a smaller size, for example a 100 pound bag requiring only a single charge, is to be filled, control center 15 will energize control device 11 accordingly and the driving motor circuit of turntable 43 in turn will be energized for rotation to the following position, on condition, however, that the interlocking means of the other stations are unlocked. If bags of a larger size, for example 200 pound bags, are to be filled the driving motor circuit of turntable 43 remains open after completion of a first 100 pound charge and becomes energized only on completion of a second 100 pound charge, for rotation of turntable 43 to the following station.

The filling height detectors 132 supervise the filling degree and initiate appropriate refilling of down-pipes 111–114 from the corresponding silo compartments. As soon as the surface level of the material in a downpipe, for example downpipe 111, drops to too low a value during operation of the associated feeding unit 101, detector 132 opens shut-off valve 131 causing compressed air to flow therethrough from air conduit system 130 into air chambers 127, 128 and through porous sloping floor plates 125, 126 into silo compartment 115, thereby to loosen the contents therein, which then drop down into and refill downpipe 115. This enables continuous and reliable operation of weighing pan feeding units 101–104. Projecting portion 122 of the silo compartment wall prevents transmission of the pressure, exerted by the material contained in compartment 115, to feeding mechanism unit 101.

At the station for compacting the bag contents, motor 152 is energized for a certain predetermined time interval to actuate tapper 151, thereby shaking the bag, while turntable 43 is locked.

During the following step of the rotation of turntable 43, the bag shown in position 4 passes to the bag discharging station, previously also termed bag marking station. As soon as turntable 43 has been stopped by limit switch 81, identification signs are applied to the bag, in compliance with its contents, by means of spraying nozzles 161–164 previously selected accordingly by central control 15 which controls the corresponding valves 165–168. This arrangement enables application of a great variety of identification signs for various purposes by appropriate selection and combination of the several valves and spraying nozzles.

After completion of the marking operation, electromagnet 177 depresses lever arm 74 and thereby opens bag clamping member 71, 72. The bag then drops onto conveyor belt 181 which carries it to bag sealing apparatus or mechanism 14, from where the closed bag can be removed.

If the material is to be shipped in bulk or loose condition, for example by means of large containers, by road, by rail or the like, turntable 43 is blocked in bag filling position, shown in FIG. 12. Bag filling spout 2 and receiving spout 191 of pneumatic conveyor conduit system 193 are connected by tube 195, a hose or the like of adequate length. The selection of the weighing pan feeding unit supplying the product desired takes places by central control equipment 15. The number of charges required and released by control unit 11 to obtain the total weight of a load will also be determined by central control 15. The sluicing mechanism 192 passes the material on to the pneumatic conveyor conduit system which conveys the material to the transport vehicle.

Figure 13:
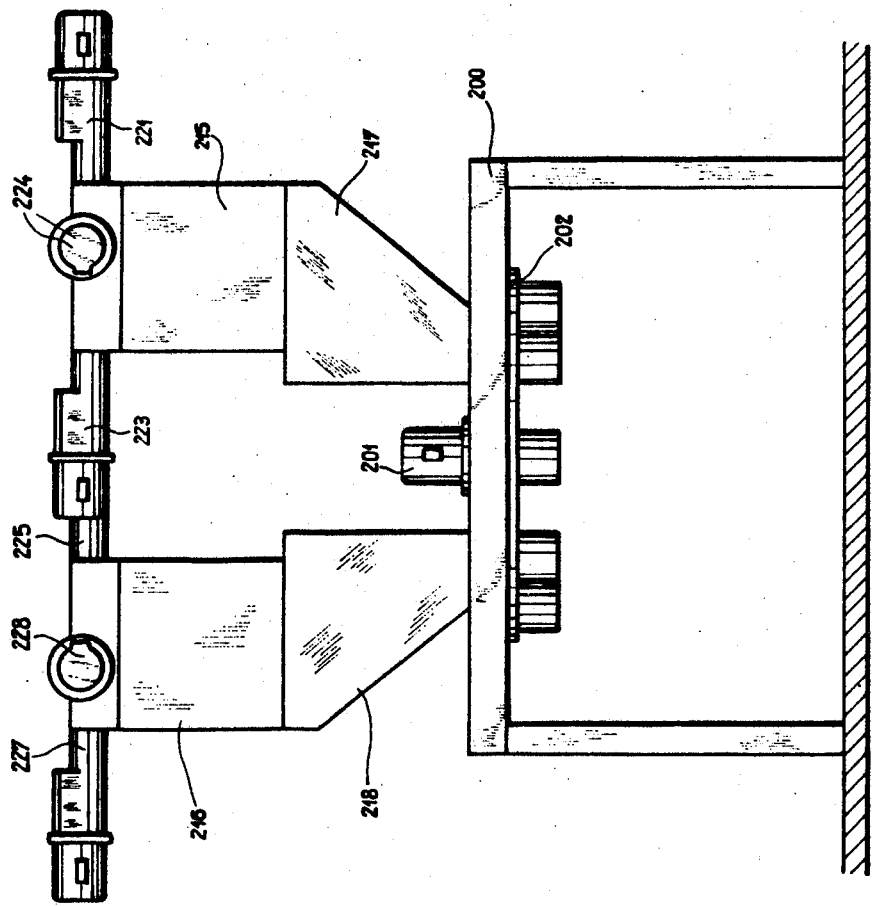
FIG. 13 is a side elevation view illustrating a modification of the invention.
Figure 14:
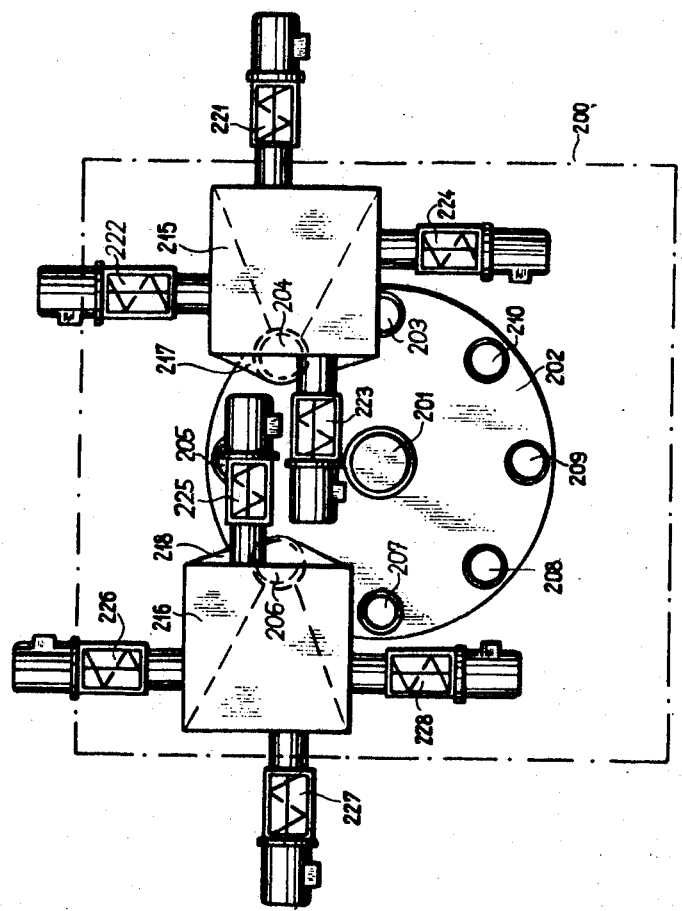
FIG. 14 is a plan view corresponding to FIG. 13.
Figure 15:
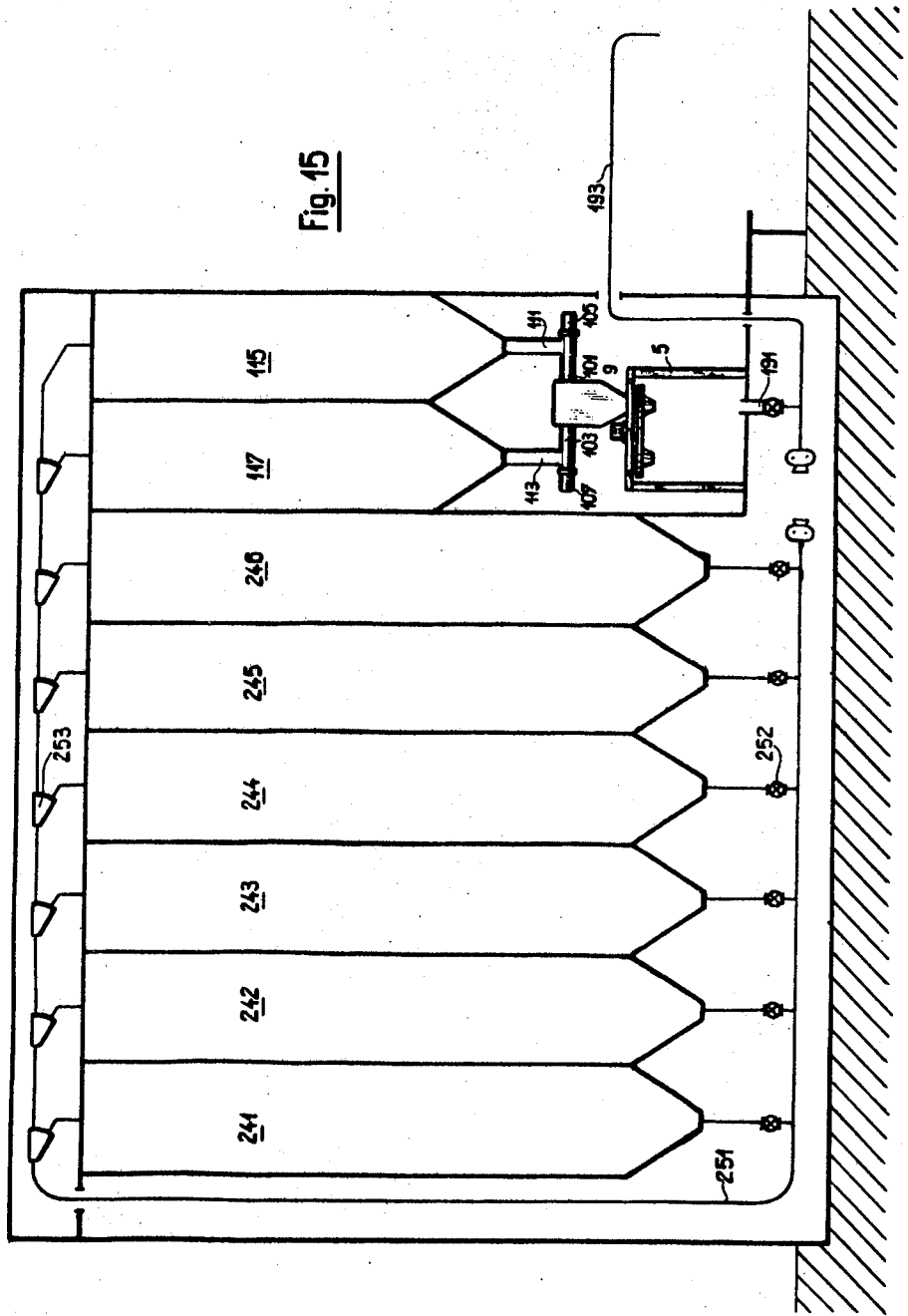
FIG. 15 is a schematic vertical sectional view illustrating a modification of a flour silo in accordance with a further embodiment of the invention.

In a modification shown in FIGS. 13 and 14, the frame structure is referred to by reference numeral 200 and carries a turntable 202 driven by a motor 201 and designed, by way of example, for a rotation cycle comprising eight positions and eight bag filling spouts. The location of these stations are referred to by reference numerals 203–210. Above frame structure 200, two weighing apparatuses 215, 216, including individual charging chutes 217, 218, are disposed at a spacing substantially corresponding to twice the interval between adjacent stations. Each weighing unit 215, 216 includes four weighing pan feeding mechanisms units 221–224 and 225–228, respectively each communicating with an individual one of eight silo compartments. Station 203 is adapted to receive empty bags. Station 204 is adapted for charging weighing unit 215. Station 205 is a waiting position. Station 206 is adapted to charge weighing unit 216. Stations 207 and 208 are spare positions. Station 209 is adapted for compacting the bag contents and station 210, the bag discharge position, is adapted to apply identification marks to the filled bags.

The functional operation is basically similar to that of the embodiment just described. In addition to the means just described, control means, enabling alternate operation of either one of the weighing units 125, 216 after completion of each step of rotation of the carousel turntable, are provided. The sequence of filling is as follows:

(a) The bags having reached stations 204 and 205 are empty, and the bag reaching station 206 has been filled at the station 204 by the weighing unit 215.

(b) Weighing unit 215 discharges to fill the bag at station 204, whereas the one at station 205 is empty and the bag at station 206 is filled.

(c) Carousel 202 moves through another step. The bag at station 204 is empty, the one at 205 filled and the one at 206 empty.

(d) Weighing unit 216 discharges. The bag at station 204 is empty, the one at station 205 is filled and the one at station 206 is filled.

(e) The carousel moves for a further step, where the situation as described at (a) is repeated.

This modification enables handling eight different kinds of product. In the event much larger quantities of one product are used than of the others, it is possible to feed both of the weighing apparatus 216, 217 by a respective weighing pan feeding mechanism, for example 222, 228, to obtain quicker filling of this product.

For the storage of flour, the capacity of the group of silo compartments communicating with a pan feeding unit is sufficient in many instances. For silos of larger capacity size, another group of silo compartments 241–246 may be added to the group of compartments 115–117 communicating with pan feeding units 101–103. The capacity of the packaging equipment described is appropriate, in most cases, for the whole silo, and the silo compartments 241–246 are interconnected, by means of pneumatically operated conveyor means 251, with the silo compartments 115–117. In the conveyor conduit system 251, sluicing means 252 and switchover means 253 are disposed. The functional operation is similar to that of the embodiments described previously.

THE CONTROL SYSTEM

The control system is shown in FIGS. 16 through 22 and 23A–23D. Before describing the control system in detail, it should be pointed out that the components included in the illustrated control system differ, in minor and immaterial details, from the corresponding components already described with respect to FIGS. 1 through 15. However, the components shown in the control system illustrations are the full mechanical and electrical equivalents of those shown in FIGS 1 through 15.

Thus, the operating means for the sack clamping device, at stations 1 and 4, are shown as oil-pressure operated pistons instead of electromagnets, as such pistons or fluid pressure actuators are more suitable from an engineering standpoint. This involves no change whatsoever in the electric circuits, as the actuating valves for the fluid pressure actuators have only two positions in the same manner as solenoid devices which are energized to either one or two positions.

From the standpoint of a practical operation, the feeding of material to member 91 is interrupted as balance beam 95 starts to tilt and disengage limit switch 98. Limit switch 99 is actuated immediately thereafter. This operation differs slightly from that previously mentioned, but it will be understood that interruption of feed to the balance is effected by tipping of balance lever 95 at a predetermined weight, so that the material already in the member 91, together with that still falling thereinto from the feed device, represents the assigned weight.

While, in the preceding description, it has been mentioned that sensing of whether or not sack stacker 7 contains bags is effected internally, in the control to be described, this sensing function has been incorporated in the central control, for the sake of simplicity.

In the control system, all control components, such as hydraulic valves, electrical components and the like have been given reference characters matching those previously described components with which they mainly act. Thus, for already described elements having two-digit reference characters, the control elements cooperable therewith have been given three-digit reference characters which are consecutive. For example, for actuation of lifter 58, there is an electro-hydraulic valve 581 which, in its neutral position, is biased by a spring 582, and which is actuated by excitation of a magnetic coil 583. Lifter 58 actuates, in addition, a limit switch 584, in the retracted position and a limit switch 585 in the extended position.

To designate the type of element, letters have been selected which permit ready graphic translation. For example, R586 is a relay functioning only as a relay, MR544 is a relay controlling a motor, or a motor relay, relay SR583 is a solenoid lifter or solenoid relay, and relay TR443 is a time relay or time delay relay. The contacts actuated by the relay windings have been given the number of the relay preceded by the letter c. This letter c is preceded by an ordinal number where plural contacts actuated by the same winding are provided. For example, relay winding R991 actuates contacts 1c991, 2c991, 3c991 and 4c991. With respect to the switches, limit switches are designated by "LS," manually operated switches "HS" and special switches, such as pressure switches, by "PS." The individual contact pairs of these switches are designated in the same manner as mentioned, by corresponding ordinal numbers. The relay actuated contacts are shown in the positions which they occupy when the relay is de-energized or dropped, and the other switches are shown in the initial and de-energized position of the entire installation.

HYDRAULIC AND PNEUMATIC SYSTEM (FIGS. 16–18)

Figure 16:
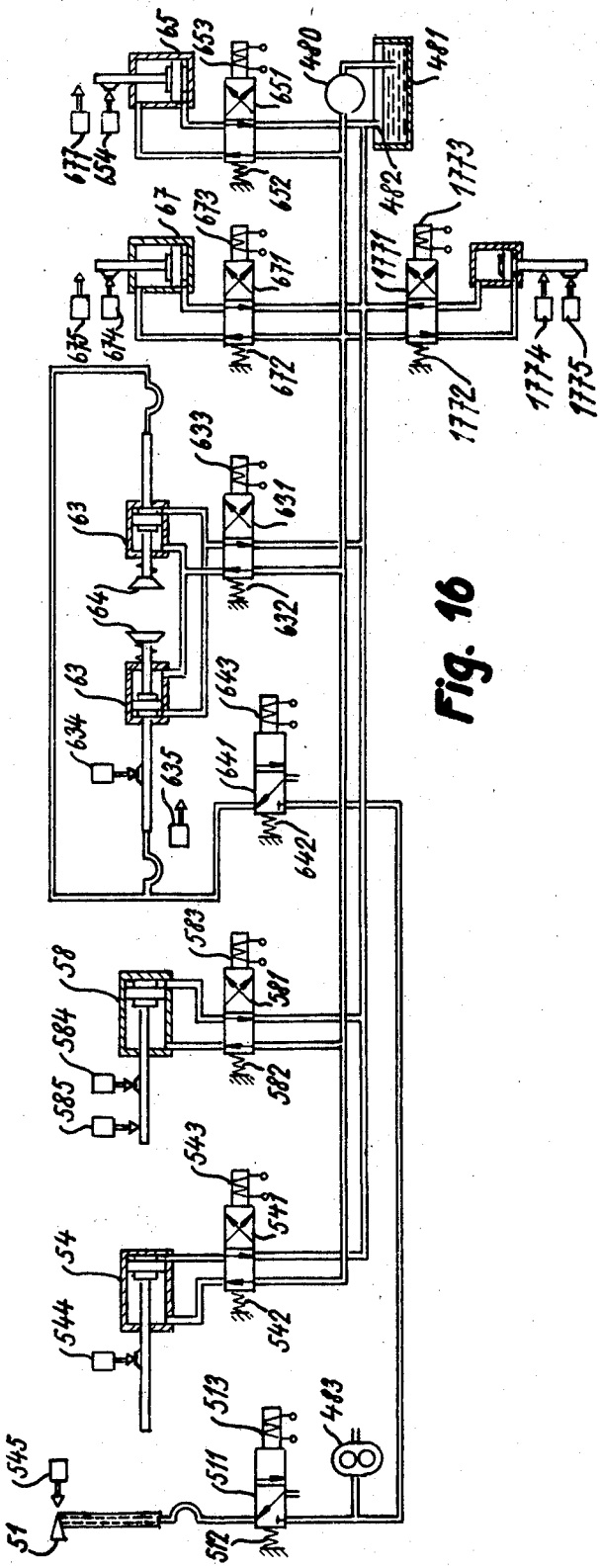
FIG. 16 is a diagram illustrating the hydraulic and pneumatic system used with the invention.

FIG. 16 shows the hydraulic and pneumatic system, numbered according to the above principles, for sack suspension and sack unloading. A pump 480 pumps oil from tank 481 and loads the electro-hydraulic valves 541, 581, 631, 671, 651 and 1771 (four-digit reference because previously mentioned element 177 for sack unloading has a three-digit reference). On the other hand, these valves are connected with tank 481 by a return flow line 482. In FIG. 16, device 177 is shown in the extended position because it must be assumed that it has dropped after a certain time due to leakage oil losses. In the diagram, the corresponding limit switch LS1775 is therefore shown actuated, with its contact 1LS1775 open and its contact 2LS1775 closed. Upon starting up the system, all auxiliary circuits are, of course, first connected, e.g. that of the drive of the pump 480 rotating continuously in operation, and piston 177 returns to the upper position before the system can operate. A blower 483 produces a vacuum and is connected to the electro-magnetic valves 511 and 641, respectively, whose third connection discharges into the atmosphere.

Figure 17:
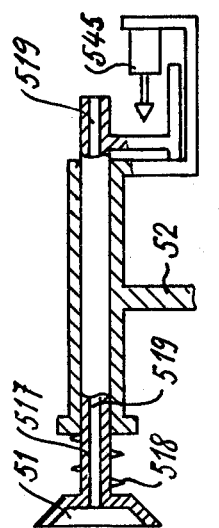
FIG. 17 is a sectional view, on a relatively large scale, illustrating the construction and mounting of suction cups forming part of the invention.
Figure 23A:
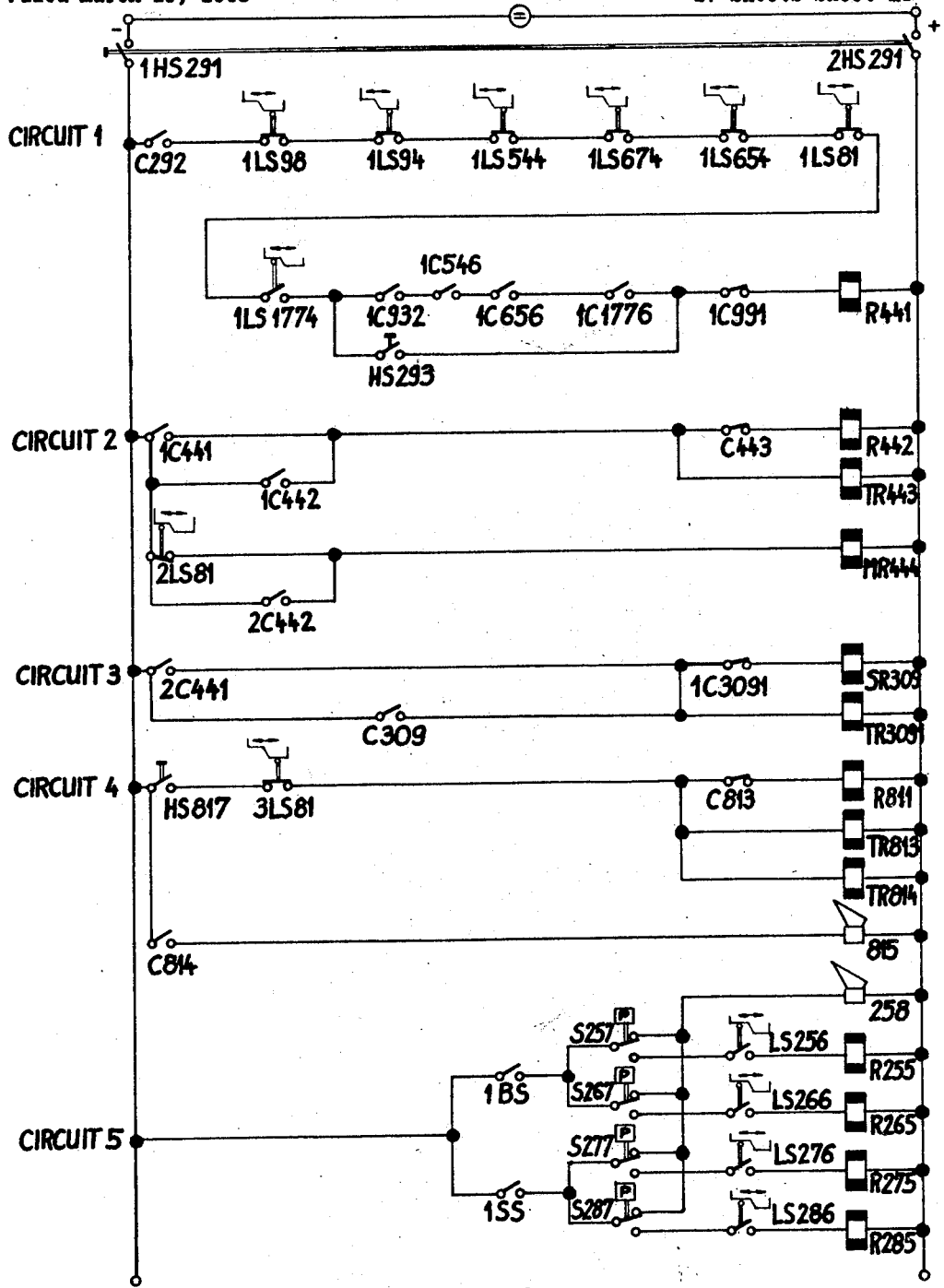
FIGS. 23A–23D constitute a schematic wiring diagram of the electrical controls associated with the sack packaging equipment of the invention.
Figure 23B:
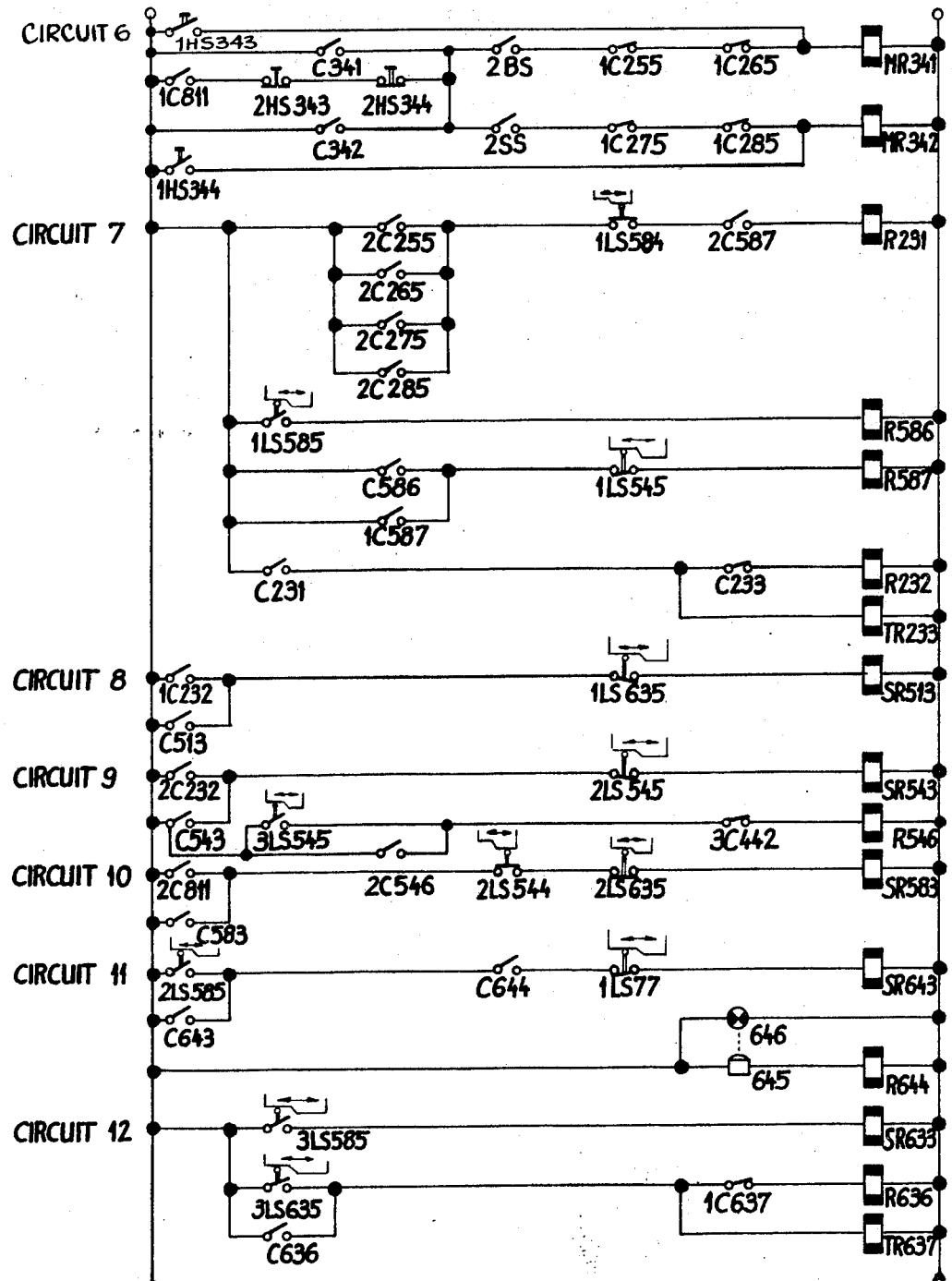
Figure 23C:
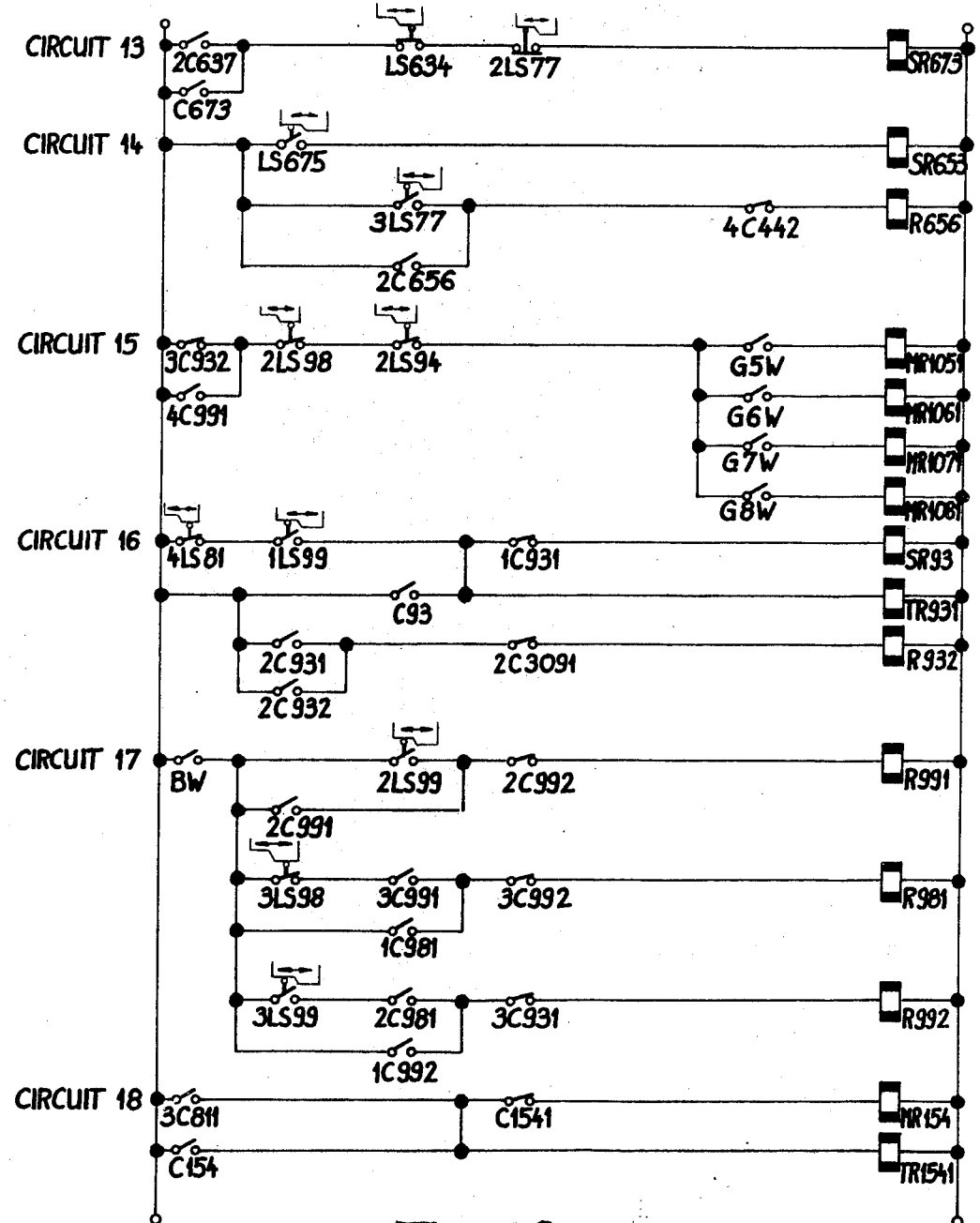
Figure 23D:
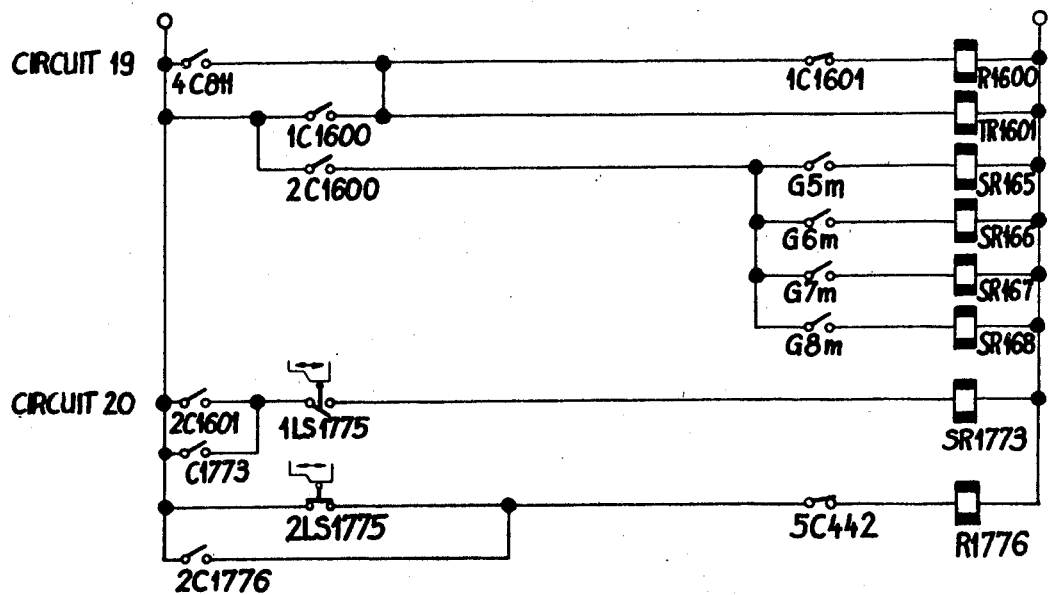

FIG. 17 shows, on a larger scale, the construction of suction cups 51. These are mounted on a push rod 517 and are biased, by a spring 518, outwardly from lever 52. They are connected with valve 511 by a bore 519. As a cup 51 strikes the stack of sacks, spring 518 is compressed and the limit switch 545 provided on lever 52 is actuated.

Figure 18:
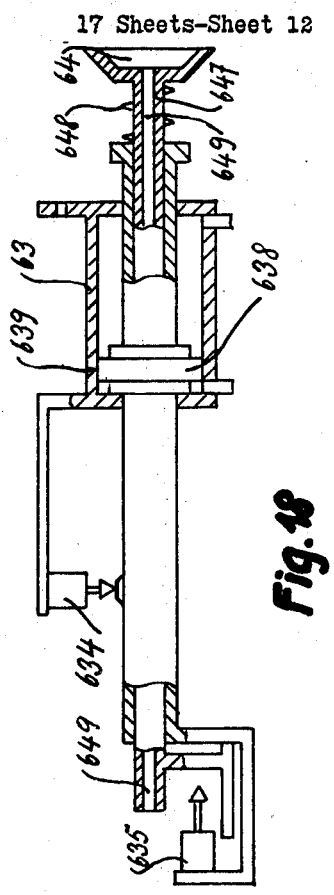
FIG. 18 is a view similar to FIG. 17, but illustrating a further form of suction cup used with the invention and the apparatus associated therewith.

FIG. 18 shows the form of the suction cups 64. These are mounted on a push rod 647 in the moveable piston 638 and are biased outwardly from piston 638 by a spring 648. In the retracted position, piston 638 (or respectively its extension) actuates the limit switch 634. When piston 638 is actuated forward, two opposite suction cups 64 strike the sack, spring 648 is compressed and limit switch 635 actuated. In the drawings, there is shown only one limit switch 545, respectively 635. For safety reasons, a separate limit switch should be provided on each individual suction cup. The coupling of the limit switches of a group can be achieved by simple common means, and it would only complicate the drawing, without contributing to the comprehension of the operation of the entire installation.

Naturally, the usual auxiliary means of the hydraulic and pneumatic cycle, such as pressure tank, excess pressure safety valve or respectively vacuum tank, low-pressure safety valve, etc., have not been shown.

SWITCH AT THE SACK STACKER (FIG. 19)

To each compartment 25, 26, 27, 28 there corresponds a limit switch 246, 266, 276, 286 provided on carriage 23. When a compartment is present in operating position at sack suspension station 8 indicated by the contour of support 53, the respective limit switch is acutated by the fixed cam 259. In each compartment, there is a respective pressure switch 257, 267, 277, 287 arranged on the displaceable table 30 and actuated by the weight of the sacks. In the diagram these switches are shown as they appear in the empty state of the compartments. Naturally the compartments must be filled before the installation is put into operation.

PRINCIPLE OF THE CONTROL AND PUNCHED TAPE UNIT (FIGS. 20–22)

The control is effected by a punched tape unit of known design. Via a slip coupling (overload clutch) 302 and a reduction gearing 303, a continuously rotating motor 301 drives the drive roll (friction roller) 304 which advances, by one step each time, the punched tape 300 by means of the lateral auxiliary perforations 305 thereof. For the control of the stepwise movement, drive roll 304 is provided with lateral cam teeth 306, which are locked each time by a pawl 307 pivotable about an axis 308. Pawl 307 is continuously biased toward the locking position by spring 310. For each one step advance, pawl 307 is briefly lifted by an electromagnet 309 and returned to the locking position by spring 310 to engage the next tooth.

Punched tape 300 has six working tracks. On a graduation of the punched tape, each sack is represented by 2 holes. Tracks B and S serve to select the size. A hole on track B means a big sack; a hole on track S means a small sack. A hole on track G5 means flour grade 5, according to the drive motor 105 of the balance feeding device 101. Tracks G6, G7, G8 have the corresponding meaning for the drive motors 106, 107, 108 of the balance feeds 102, 103, 104. At the reading station 320 the perforation for three different sacks is scanned at the same time. At reading station S, the data for the selection of a sack are noted, in this case a small sack. At the reading station W (Weigher), which is two steps further on (corresponding to two quarter rotations of turntable 43), there are read the sack size (for selection of one or two pourings) and the flour grade. In FIG. 20, a big sack of grade G8 is concerned. At the reading station M (Marking), which is again arranged two steps later, there is read the perforation for the marking of the sack present at the unloading station. It is a sack of grade G7. The raster of the required holes is represented in FIG. 21 by correspondingly numbered switches. It will be evident from FIG. 21 that switch Sw is not absolutely necessary.

These switches may be, for example, photo-cells closing a circuit by action of light. For the sake of simplicity, the respective switches are marked the same in the circuit drawings, without representing the well-known relays, which actually are necessary.

FIG. 22 shows the punched tape with the sequence of the sacks and can be used to describe the course of an operation from the start, i.e. from the time the system is switched on.

It can be seen from the diagram of the central control that the punched tape begins its step at the same time as the rotary platen 43 stars its quarter rotation. It is essential for the control that this step is naturally ended much sooner (much smaller paths and moved masses) than the quarter rotation of the rotary platen. The latter takes about 1 second, and the step of the punched tape requires only a small fraction thereof.

It should be noted also that the filling and emptying of the balance is the longest operation, which determines the speed of the work. Even for a small sack, this takes about 6-seconds. The other functions, such as sack selection with fetching of the sack, sack suspension, sack marking and sack unloading, require less time.

OPERATION OF THE CONTROL (FIGS. 23A–23D)

Before starting up the installation, compartments 25, 26, 27, 28 of the sack stacker must be filled with sacks. The switches S257, S267, S277, S287 (circuit 5) are thereby closed. The punched tape is inserted with the perforation of the first sack one step before the reading station S. The auxiliary means are switched on, i.e. motor 301 and the photo-cells for the punched tape, blower 483 for the suction caps, and pump 480 for the hydraulic system. By this latter measure, piston 177 is returned to the retracted position and switch 1LS1774 in circuit 1 closed. As soon and as long as the auxiliary means operate correctly, contact C292 in circuit 1 is kept closed. Then the main switch 1HS291, 2HS291 of the central control is closed and remains in the closed position.

CIRCUIT 1—IMPULSE FOR THE QUARTER ROTATION OF THE ROTARY PLATEN AND FOR THE STEP OF THE PUNCHED TAPE

The energization of relay R441 establishes the rhythm of the system. For this energization to be able to take place, a number of conditions must be fulfilled. A member of switches and contacts are arranged in series, and all must be closed to permit the start of the work cycle. The band switch HS293, which is depressed briefly, and which returns to the open position, is used only for the starting and stopping of the machine.

The limit switches make sure that the various machine parts are in the starting position: 1LS81 rotary platen locking, 1LS98 balance empty, 1LS94 balance evacuating valve closed, 1LS544 lever 52 of the sack-charging unit vertical, 1LS674 lifter 67 for the lifting of the sack around the sack bell retracted, 1LS654 lifter 65 for the sack clamping retracted, 1LS1774 lifter 177 for the unloading of the sack retracted.

Four contacts ensure that during the preceding cycle the functions have been fulfilled: 1C932, that the balance has become full (circuit 16), 1C656, that a sack has been clamped on a bell (circuit 14), 1C546, that a sack has been fetched from the stacker (circuit 9), 1C1776, that a sack has been unloaded (circuit 20). The first three cycles must be initiated each time by brief depression of the hand switch HS293. Before the first cycle, all four of these contacts are open, and the operation must be repeated for the initiation of the second and third cycle, as the first pouring of the balance, and hence the first closing of contact 1C932, is effected only in the course of the third cycle. Also, for the stopping of the work, the last cycle must be initiated by brief pressing of the hand switch HD293, because no pouring of the balance occurs when the last sack is at the sack beating or compacting station.

As has been mentioned, contact C292 remains closed as long as the auxiliary means operate correctly. Contact 1C991 is opened, when filling a big sack, after the first filling of the balance, so that the second filling of the balance can occur before an impulse for initiation of the next cycle is given (circuit 17). After the second filling, contact 1C991 is closed again.

CIRCUIT 2—QUARTER ROTATION OF THE ROTARY PLATEN 43 BY MOTOR 44

By energization of relay R441, contact 1C441 is closed and relay R442 energized. This causes holding contact 1C442 to close. At the same time, contact 2C442 closes and relay MR444 is energized and energizes motor 44 of the rotary platen 43. When the rotary platen has left the locking position, limit switch 2LS81 closes. Later, time relay TR443 responds and opens contact C443. Relay R442 is de-energized and contacts 1C442 and 2C442 open. At this moment, contact 1C441 is already open because relay R442, on being energized, has opened the contact 4C442 in circuit 14 for the clamping of the sack, and thus has de-energized relay R656. Contact 1C656 in circuit 1 is thus open again, and relay R441 can be energized again only when all conditions are fulfilled. Also contact 5C442 in circuit 20, for the unloading of the sack, has been opened and relay R1776 has become de-energized. Thereby 1C1776 in circuit 1 also has been opened. The same is true of contact 3C442, in circuit 9 for the fetching of a sack from the stacker, controlling relay R546, as well as contact 1C546 in circuit 1. Although contact 2C442 has been opened again, relay MR444 is still energized, owing to the closed limit switch 2LS81, until platen 43 has completed its quarter revolution and limit switch 2LS81 is opened again. Then relay MR444 becomes de-energized and the rotary platen 43 is locked in its fixed position.

CIRCUIT 3—MAGNET 309 FOR THE RELEASE OF ONE STEP OF THE PUNCHED TAPE

When relay R441 in circuit 1 is energized, it closed also contact 2C441. The coil SR309 of magnet 309 is energized at the same time as relay R442 (circuit 2). Magnet 309 lifts pawl 307 and releases the movement of drive roll 304. Holding contact C309 closes. Then time relay TR3091 responds and opens contact 1C3091. Coil 309 becomes de-energized and spring 310 presses pawl 307 in, which blocks the movement of the drive roll 304 as the next tooth 306 arrives. Thus the punched tape has been moved by one step, and the perforation for the first sack has reached reading station S.

CIRCUIT 4—AUXILIARY CIRCUIT FOR THE GIVING OF AN IMPULSE UPON LOCKING OF ROTARY PLATEN 43 (LIMIT SWITCH 81)

This control impulse is needed for the initiation of various functions: In circuit 6 for the selection of the compartment, in circuit 10 for feeding the sack at the opening station, in circuit 18 for beating or compacting the sack, and in circuit 19 for the marking of the sack.

Before switching on the main switch 1HS291, 2HS291 of the central control, hand switch HS817 is open in order that an impulse is not given already at that moment. When the rotary platen has started its first quarter revolution and limit switch 3LS81 has been opened, switch HD817 can be closed. It then remains in this position. When the quarter revolution is completed, limit switch 3LS81 is closed again and relay R881 is energized. Shortly thereafter time relay TR813 responds and opens contact C813. Relay R811 becomes de-energized and has briefly operated the contacts 1C811 in circuit 6, 2C811 in circuit 10, 3C811 in circuit 18, and 4C811 in circuit 19.

As the machine comes to a stop, when the perforation for at last sack has left reading station W, contact 1C932 in circuit 1 is no longer closed. The rotary platen remains in the locked position and limit switch 3LS81 remains closed. After a time, which, of course, must be a multiple of the work cycle, time relay TR814 responds and closes contact C814. With that the warning system 815 is switched on, and the personnel's attention is called to the fact that it must initiate the last cycle by brief depression of the switch HS293 in circuit 1.

CIRCUIT 5—PREPARATION OF SACK SELECTION, AND CIRCUIT 6. BRINGING THE DESIRED COMPARTMENT OF THE SACK STACKER BEFORE THE SACK CHARGING UNIT (MOTOR 34)

To reduce the length of the movements, the central compartments 26 and 27 are used, while the outer compartments 26 and 27 are used, while the outer compartments 25, 28 serve as spares in case of exhaustion of one of the central compartments. The central starting position of FIG. 19 is assumed.

When the perforation for the first sack has reached reading station S, in the case of the punched tape according to FIG. 22, switches 1SS, 2SS are closed. As the stacker has been filled with sacks before the system was switched on, switches S257, S267, S277, S287 are in the supply lines of relays R255, R265, R275, R285, respectively. When the rotary plates has completed its quarter revolution, limit switch 3LS81 in circuit 4 is closed and relay R811 closes contact 1C811 for a short time in the above described manner. Relay MR342 is energized and closes holding contact C342. Motor 34 moves the carriage 23 in the direction of the small sacks, until limit switch LS276 (FIG. 19) is closed by cam 259. Relay R275 is energized and opens contact 1C275 in circuit 6. Relay MR342 is de-energized, holding contact C342 is opened, and motor 34 stops. The correct compartment 27 is now in place.

The next sack on punched tape 300 is likewise a small sack. Upon the completion of the next step of the punched tape, switches 1SS and 2SS are closed again. As limit switch 1S276 is already closed, relay R275 is energized immediately and opens contact 1C275. Upon brief closing of contact 1C811, therefore, relay MR342 is not energized and carriage 23 remains in place.

The punched tape 300 indicates, as the third sack, a big sack. After completion of the third step of punched tape 300, switches 1BS and 2BS close. Relay MR341 is energized upon brief closing of contact 1C811 and moves the stacker in the direction of the big sacks. Limit switch 1S276 is opened and the movement continues until limit switch LS266 is closed. Then relay R265 is energized and opens contact 1C265 in circuit 6. Relay MR341 becomes de-energized and motor 34 stops. The correct compartment 26 is now in place.

If compartment 26 should be empty, then pressure switch S267 transfers into the circuit of the warning system 258. As limit switch LS266 closes, relay R265 is not energized, because pressure switch S267 is open in its supply circuit. Contact 1C265 in circuit 6 remains closed and relay MR341 energized. Motor 34 continues to drive carriage 23 until limit switch LD256 is actuated by cam 259. Then compartment 25 is in the correction position for the delivery of a big sack.

The personnel summoned by warning system 258 can fill compartment 26. As soon as a small sack is called up by the central control, carriage 23 is moved, by energization of relay MR342, in the direction of the small sacks until limit switch 276 is actuated by cam 259. The removal of sacks from compartments 26, 27 starts again.

In case no small sack is called for a prolonged time, it is possible to press the hand switch 1HS244 after a sack has been taken over. Relay MR342 is energized, so that motor 34 moves the carriage toward the center. By the opening of switch 2HS344, interference with the normal control is avoided. Switch 1HS344, 2HS344 returns to the original position as soon as it is no longer depressed. Hand switch 1HS343, 2HS343 is used accordingly when a movement in the outer direction is desired.

CIRCUIT 7—GIVING AN IMPULSE FOR INITIATION OF THE MOVEMENT OF RACK 55 FOR FETCHING A SACK

As soon as the correct compartment of the sack stacker, for example, for the first sack of the punched tape according to FIG. 22, compartment 27, is in the correct position, relay R275, of circuit 5 is energized, as described above, and closes contact 2C275 in circuit 7. Limit switch 1LS584 ensures that the rotatable support 53, operated by means 58, is at the stacker. Contact 2C587 provides that, starting with the second cycle, the sack fetched and made ready by lever 52, operated by means 54, in the preceding cycle has been transferred to the sack suspension station, by actuation of means 58 (circuit 10) before the newly selected sack is picked up by lever 52. This is achieved by means of contact 2C587: When means 58 completes the transfer stroke, limit switch 1LS585 closes and relay R586 is energized. With that, contact C586 closes and relay R587 is energized and closes holding contact 1C587. At the same time contact 2C587 is closed. When means 58 begins the return stroke, limit switch 1LS585 opens and relay R586 becomes de-energized. Contact C586 opens, but holding contact 1C587 remains closed. When the support 53 has been directed toward the sack stacker 7, limit switch 1LS584 closes again and relay R231 is energized, contact C231 closed and relay R232 energized. After a short time, time relay TR233 responds and opens contact C233. Relay R232 becomes de-energized again. Thus the contacts 1C232 in circuit 8 (vacuum of the suction cups 51) and 2C232 in circuit 9 (fetching of the sack from the stacker) have been closed briefly. In this way an impulse for the control of these two circuits has been given.

When, by movement of lever 52 the suction cups 51 contact the selected sack in the stacker (circuit 9), limit switch 1LS545 is opened. Relay R587 becomes de-energized and holding contact 1C587 is opened. Contact 2C587 is likewise opened. With the withdrawal of the suction cups 51, with the selected sack, by lever 52 operating by means 54, limit switch 1LS545 closes again and the supply circuit of relay R587 is prepared for the next work cycle.

CIRCUIT 8—SWITCHING ON THE VACUUM AT THE SUCTION CUPS 51 (VALVE 511)

Owing to the brief closing of contact 1C232, as described above for circuit 7, relay SR513 is energized and valve 511 connects the suction cups 51 to the suction blower 483. Holding contact C513 is closed. As the suction cups 64, operated by means 63, strike against each other on the sack at the sack opening station (circuit 12), limit switch 1LS635 opens. Solenoid SR513 is de-energized and holding contact C513 opens. The vacuum at suction cups 51 is terminated.

CIRCUIT 9—FETCHING THE SACK FROM THE STACKER

After the turning of support 53 (means 58, circuit 10) to its position at the stacker, as described for circuit 7, contact 2C232 is closed briefly as soon as a compartment of the stacker is in the correct position. Solenoid SR543 is energized and closes holding contact C543. Sack 55 is extended until suction cups 51 impinge on the selected sack and limit switch 2LS545 opens. Solenoid SR543 becomes de-energized and holding contact C543 opens. Valve 541 goes back to the original position and rack 55 is retracted. Lever 52 thus returns, with the sack, to the vertical position.

With the brief closing of limit switch 3LS545 relay R546 has been energized, which has closed the holding contact 2C546. With that, contact 1C546 in circuit 1 closes to report that a sack is ready. With the impulse generation by energization of Relay R441 of circuit 1, relay R442 of circuit 2 is energized and opens contact 3C442. Relay R546 becomes de-energized and contact 2C546, as well as contact 1C546 in circuit 1, open.

CIRCUIT 10—TRANSFER OF THE SACK TO THE OPENING STATION

Limit switch 2LS544 is a safety device which ensures that rack 59 can be moved only when rack 55 is in the retracted position.

After completion of the quarter revolution of rotary platen 43, contact 2C811 is closed briefly, as described above for circuit 4. Solenoid SR583 is energized and closes holding contact C583. When the suction cups 63 at the sack opening station strike against each other on the sack (means 63, circuit 12), limit switch 2LS635 is opened. Solenoid 583 becomes de-energized and holding contact C583 opens. Valve 581 is brought back to the original position by spring 582, and means 58 turns support 53 back to its position at the sack stacker. This is possible because the vacuum at suction cups 51 has simultaneously been interrupted by operation of limit switch 1LS635 (circuit 8). The sack is now held by suction cups 64 of the sack opening and lifting station.

CIRCUIT 11—CONNECTION AND DISCONNECTION OF SUCTION CUPS 64 FOR THE OPENING AND LIFTING OF THE SACK

When rack 59 reaches the end of the transfer stroke, the flow of light between lamp 646 and photoelectric cell 645, operating with dimmer circuit, has previously been interrupted with the entrained sack. With that, relay R644 has been energized and contact C644 closed. Limit switch 2LS585 is closed and solenoid SR643 is energized and closes holding contact C643. Valve 641 connects suction cups 64 with the suction blower 483. After arrival of suction cups 64 on the sack rack 59 is retracted, as described above for circuit 10. Limit switch 2LS585 thus opens, but solenoid SR643 remains energized owing to the closed holding contact C643. When the sack has been clamped on the sack bell (circuit 14), limit switch 1LS77 opens briefly. Solenoid SR643 is de-energized and holding contact C643 opens. The vacuum at suction cups 64 is interrupted or terminated.

Photo-cell 645 and lamp 646 are advantageously arranged on opposite halves of the support 62 between the means 63, or just below. As the machine starts, in the first cycle, and as it comes to a stop, during the last three cycles of the machine, no sack is fed. In these cycles, therefore, the photo-cell 645 does not respond and contact C644 remains open. Suction cups 64 meet without a sack being present between them, and because the vacuum is then not connected, they can be withdrawn. The operation of the various operating means occurs automatically without difficulty.

CIRCUIT 12—OPENING OF THE SACK (MEANS 63)

Upon arrival of rack 59 in the transfer position, limit switch 3LS585 closes solenoid SR633 is energized and the means 63 move cups 64 towards each other. When suction cups 64 strike the sack, limit switch 3LS635 is actuated. As described above, circuit 8, for the vacuum of the suction cups 51, and circuit 10, for the return of the means 52, are thereby opened. When means 58 leaves the transfer station, limit switch 3LS585 opens again and solenoid SR633 becomes de-energized. Valve 631 returns to the original position and elements 63 retract cups 64. The sack is thus opened (see FIGS. 6 and 7).

With its actuation, limit switch 3LS635 has energized relay R636 and, holding contact 1C636 closes. As described above, limit switch 3LS635 opens again, but relay R636 remains energized owing to holding contact C636. After a time which is sufficient for the opening of the sack, time relay TR637 responds and opens contact 1C637. Thereby relay R636 becomes de-energized and contact C636 opens. Time relay TR637 closes at the same time contact 2C637 in circuit 13 for the lifting of the sack.

CIRCUIT 13—LIFTING OF THE SACK (LIFTER 67)

Time relay TR637 in circuit 12 closed contact 2C637. Solenoid SR673 is energized and closes the holding contact C673. Should the sack not yet be opened, then limit switch LS634 at means 63 would not be closed. As contact 2C637 closes only briefly (because of the opening of holding contact C636 in circuit 12), no energization of solenoid SR 673 would take place in this case, and thus lifter 67 would not be actuated. Thus limit switch LS675 in circuit 14 for the clamping of the sack could not be actuated and consequently the machine would not be stepped. Thereby, after some time, warning system 815 in circuit 4 would be actuated, and the personnel can extend the delay time of the time relay TR637 in circuit 12. The machine can be set in motion again by a single manual operation of limit switch 3LS635 in circuit 12.

At normal response of the solenoid SR673, lifter 67 lifts the sack around the sack bell. At the end of its stroke, the limit switch LS675, in circuit 14 for sack clamping, closes. Lifter 67 remains in the extended position until the sack is clamped and limit swtich 2LS77 is actuated. Then solenoid SR673 is de-energized and holding contact C673 is opened again. Valve 671 resumes the original position and lifter 67 is lowered. Limit swtich LS675 in circuit 14 opens again. In the retracted position, limit switch 1LS674 in circuit 1 is closed again.

CIRCUIT 14—CLAMPING OF THE SACK (LIFTER 65)

By the closing of the limit switch LS675, as described above for circuit 13, solenoid SR653 is energized. Lifter 65 is extended and, at the end of its stroke, it clamps the sack by actuation of link 74 at the sack bell. At the same time, limit swtich 2LS77 in circuit 13 is opened. By the retraction of lifter 67, limit swtich LS675 opens. Solenoid SR653 is de-energized and valve 651 goes back to the original position. Lifter 65 is retracted and, in the retracted position, limit swtich 1LS654 in circuit 1 is closed again. The retraction can take place because, upon clamping of the sack, limit switch 1LS77 in circuit 11 has been opened and the vacuum to suction cups 64 disconnected.

With the closing of limit swtich 3LS77 on clamping of the sack, relay R656 is energized and holding contact 2C656 closed. Simultaneously contact 1C656 in circuit 1 is closed. By the retraction of lifter 65, limit switch 3LS77 is opened again. With the excitation of relay R441 in circuit 1, relay R442 in circuit 2 is energized, as described above. With that, contact 4C442 is opened, relay 656 is de-energized, the contact 2C656 is opened again, also contact 1C656 in circuit 1.

CIRCUIT 15—FILLING OF THE BALANCE

In the case of the punched tape according to FIG. 22, first a small sack of grade G6 is indicated by the perforations. As the balance is empty, limit switch 2LS98 is closed, as gate 92 is closed, limit swtich 2LS94 is also closed. When the perforation for this first sack reaches reading station W, swtich G6W closes. Relay MR1061 is energized and motor 106 of balance feeding device 102 is driven. The balance is filled until the response weight is reached and balance beam 95 tips. Thereby limit switch 2LS98 opens and relay MR1061 is de-energized. The balance feeding device 102 is switched off. By the evacuation of the balance (circuit 16) contact 3C932 is opened, until the energization of relay R441 in circuit 1 has initiated a new cycle.

Contact 4C991 is connected only for the filling of a large sack (circuit 17), to permit a second pouring of the balance before the next cycle is initiated.

CIRCUIT 16—EVACUATION OF THE BALANCE

The case of the small sack is considered further. With the rotary platen locked, limit swtich 4LS81 is closed. When the balance is full, limit swtich 1LS99 is closed. Solenoid relay SR93 is energized and opens the gate 92. At the same time, holding contact C93 closes, in order that, upon the return of the balance container, limit switch 1LS99 can be opened without gate 92 closing at the same time. After a time which ensures complete evacuation of the balance container, time relay TR931 responds and opens contact 1C931. Solenoid relay SR93 is de-energized, holding contact C93 opens, and gate 92 closes again. At the same time, time relay TR931 has briefly closed contact 2C931. Thus relay R932 has been energized and has closed holding contact 2C932. At the same time, contact 1C932 in circuit 1 is closed, and contact 3C932, in circuit 15 of the balance filling, has been opened. As described above, in the case of a small sack no further filling can occur until a new cycle has been initiated by energization of relay R441 in circuit 1.

Upon initiation of the next cycle by relay R441 in circuit 1, the perforations for the preceding sack must have left the reading station W before filling can be initiated. This is achieved in that the interruption of the supply circuit of relay R932 occurs, not immediately upon energization of relay R441 in circuit 1, but in response to operation of time relay TR3091 in circuit 3, for the release of the step of the punched tape unit, which opens contact 2C3091. Relay R932 is thus de-energized when the perforations of the preceding sack are no longer at reading station W. Holding contact 2C932 opens and contact 3C932, in circuit 15 for the filling of the balance, is closed. The filling operation can start. Contact 1C932 in circuit 1 also opens.

CIRCUIT 17—FILLING OF A BIG SACK

This circuit corresponds to the control means 11 of the original FIG. 1. A simple counter is involved.

This circuit will be explained with reference to the third sack of the punched tape according to FIG. 22. When these perforations reach reading station W, switch Bw is closed. The first pouring occurs as above in the case of the small sack, and the connection of circuits 15, 16 occurs as described above. Upon initiation of the closing movement of gate 92 of the balance container by response of time relay TR931 (circuit 16), contact 3C932 in circuit 15 (energization of relay R932) is opened also in this case.

Previously, however, limit switch 2LS99 has been closed with the tilting of the balance beam, that is, simultaneously with the start of the running time of time relay TR931, by closing of limit switch 1LS99 in circuit 16. Thereby relay R991 has been energized and holding contact 2C991 closed. At the same time contact 1C991 in circuit 1 has been opened, so that, for the present, no new cycle can be initiated by energization of relay R441. At the same time, contact 4C991 in circuit 15 has been closed, so that, if later, after the run-down of time relay TR931, contact 3C932 has opened, this contact 3C932 has already been bridged by the closed contact 4C991. As switch G6w in this circuit 15 is still closed, relay MR1061 can be energized again when both limit switch 2LS98—by return of the balance container to the empty position—and limit switch 2LS94—by return of the end valve to the closed position—are closed again, so that motor 106 of balance feeding device 102 is energized.

When relay R991 has been energized by the first filling of the balance container and the first closing of limit switch 2LS99 caused thereby, contact 3C991 in circuit 17 also has been closed. When the balance container has attained its empty condition, limit switch 3LS98 is closed again, relay 981 energized, and holding contact 1C981 closed. At the same time, contact 2C981 has been closed.

When the balance container has been filled for the second time, limit switch 2LS98 in circuit 15 is opened by tilting of the balance beam and thereby relay MR1061 de-energized. Motor 106 of the balance feeding device 102 is de-energized the second time. Then limit switch 3LS99 closes and relay R992 is energized. Holding contact 1C992 is closed. At the same time, contacts 2C992 and 3C992 open. By the opening of contact 2C992, relay R991 is de-energized and contact 1C991 in circuit 1 is closed again. Simultaneously, contact 4C991 in circuit 15 opens, and, as contact 1C932 is still open, no third pouring of the balance can be initiated before initiation of a new cycle by energization of relay R441 in circuit 1. When relay R991 has been de-energized, holding contact 2C991 and contact 3C991 in circuit 17 also have opened. At the same time, by opening of contact 3C992, relay R981 has been de-energized, so that holding contact 1C981 and contact 2C981 have been opened.

As limit switch 2LS99 has been closed again simultaneously with limit switch 3LS99, the closing of contact 2C992 must be delayed until the balance beam has left the full position and limit switch 2LS99 has been opened again. This is effected in a simple manner in that the brief response of time relay TR931 in circuit 16, which for the second time, just as described above, occurs this time upon initiation of the second closing movement of the end valve 92, is used for the brief opening of contact 3C931 in circuit 17. Thus relay R992 is de-energized holding contact 1C992 is opened, and contact 2C992 and 3C992 are closed again.

CIRCUIT 18—BEATING OR COMPACTING OF THE SACK (MOTOR 152)

With the locking of the rotary platen after its quarter revolution, contact 3C881 is briefly closed, as described above in circuit 4. Relay MR154 is energized and closes holding contact C154. After expiration of the time provided for the heating of the sack, time relay TR1541 responds and opens contact C1541. Relay MR154 is de-energized and holding contact C154 is opened. The beating of the sack is completed.

CIRCUIT 19—MARKING OF THE SACK

This circuit will be explained with reference to the first sack of the punched tape of FIG. 22. When the perforations of the respective sack reach reading station M, switch G6m is closed. Then, upon locking of the rotary platen after its quarter revolution, contact 4C811 is briefly closed, as described above in circuit 4. Relay R1600 is energized. Holding contact 1C1600 is closed, contact 2C1600 likewise and solenoid coil SR166 is energized. With that, valve 162 opens and the color corresponding to the flour grade is sprayed on the sack through valve 162. After the time provided for the opening of the valve, time relay TR1601 responds and opens contact 1C1601. With that, relay 1600 is de-energized and holding contact 1C1600 and contact 2C1600 open. Thereupon, solenoid coil SR166 is de-energized and valve 162 closes. The marking operation is completed.

CIRCUIT 20—UNLOADING OF THE SACK (LIFTER 177)

With the switching on of the auxiliary installations, in particular pump 480, lifter 177 has been retracted, so that limit switch 1LS1775 has been closed and limit switch 2LS1775 opened.

When time relay TR1601 in circuit 19 determines the end of the marking operation, it briefly actuates contact 2C1601 in circuit 20. Solenoid coil SR773 is energized and holding contact 1C1773 is closed. Valve 1771 is switched and lifter 177 is pressed downward. By pressing of link 74, the sack clamping device is opened and the sack unloaded. At the end of its stroke, lifter 177 opens limit switch 1LS1775. Thereupon, solenoid relay SR1773 is de-energized and contact C1773 is opened. Valve 1771 resumes the original position and lifter 177 is pulled back. At the end of its stroke, lifter 177 has closed briefly also limit switch 2LS1775. Relay R1776 is thereby energized and holding contact 2C1776 closed. At the same time contact 1C1776 in circuit 1 is closed. After initiation of the next cycle by the energization of relay R441 in circuit 1, relay R442 in circuit 2 is energized and contact 5C442 in circuit 20 is opened. With that, relay R1776 is de-energized and holding contact 2C1776 open. Also contact 1C1776 in circuit 1 is opened. At the end of its return stroke lifter 177 again closes switch 1LS1774 in circuit 1.

Many details of the equipment described may of course be modified without departing from the scope of this invention. Such a modification may, for example, concern the central control equipment 15 which may be adapted for manual selection of particular programs by means of appropriate preselectors, instead of punched card or tape control means, or an arrangement forming part of an electronic data processing equipment could be used.

Another modification may consist in the arrangement of the bag marking mechanism, which may be arranged in combination with another carousel station. Instead of a bag marking device comprising ink spraying means, a printing or mark stamping mechanism, or a labelling apparatus, may be used, for example, in combination with the bag storage apparatus or the bag filling station.

It is, however, less advisable to dispose the bag marking means at too early a stage of the packaging cycle. Bag marking after filling is usually more reliable. Type and arrangement of the bag marking means used are in no way essential features of the idea of this invention. It is however, important that such bag marking means are at all provided and form part of the equipment, whereby such bag marking means are adapted to operate automatically in accordance with the bag contents.

While specific embodiments of the invention have been shown and described in detail to illustrate the application of the principles of the invention, it should be understood that the invention may be embodied otherwise without departing from such principles.

What is claimed is:

1. Equipment for filling sacks and bags with material of a powdery nature, comprising, in combination, a bag filling apparatus, a weighing apparatus, including a weighing pan, disposed above said bag filling apparatus and discharging metered quantities of material directly into sacks and bags on said bag filling apparatus, a plurality of silo compartments, a number of feeding mechanisms each communicating directly wiht a respective silo compartment and operable, when activated selectively, to feed material from the associated silo compartment directly to said weighing pan, and automatic selecting means operable to stop operation of a then activated one of said feeding mechanisms upon completion of a delivery of a predetermined number of charges of equal weight to said bag filling apparatus and to activate another weighing pan feeding mechanism.

2. Sack-filling equipment, according to claim 1, wherein said bag filling apparatus includes a bag marking mechanism and control means, operable to mark the bags ing accordance with their contents, such as kind and grade of the product, weight and the like, in response to corresponding control signals from said control means and in coordinated functional relation with said feeding mechanisms.

3. Sack-filling equipment, as claimed in claim 2, wherein said bag filling apparatus comprises bag storage means, a bag transfer mechanism for empty bags, and additional control means operable to actuate said bag transfer mechanism and said feeding mechanisms in coordinated functional relationship.

4. Sack-filling equipment, according to claim 2, in which said bag filling apparatus includes compacting means operable to compact the bag contents.

5. Sack-filling equipment, according to claim 2, in which said bag filling apparatus includes bag sealing means.

6. Sack-filling equipment, according to claim 2, comprising a centralized selecting system operable to determine pre-selected numbers of equal weight charges, to mark the bags and to effect operational functions which may be desired.

7. Sack-filling equipment, according to claim 6, wherein said centralized selecting system includes control means operable by punched control means of the type including punched cards and punched tape.

8. Sack-filling equipment, according to claim 1, comprising a plurality of said feeding mechanisms operable to feed directly into one and the same weighing pan.

9. Sack-filling equipment, as claimed in claim 8, wherein the size of the weighing apparatus is adapted to a filling charge for smaller bags and which filling charge is a fraction of the filling charge for larger bags, and means operable to adjust the number of such fractional charges required for filling larger bags.

10. Sack-filling equipment, according to claim 1, wherein the bag filling apparatus includes a carousel mechanism transporting bags and sacks step-by-step to plural successive stations.

11. Sack-filling equipment, according to claim 10, comprising in combination, two weighing apparatuses disposed above said carousel mechanism, each weighing apparatus having a respective plurality of said feeding mechanisms communicating directly therewith, each of said feeding mechanisms communicating with a respective silo compartment.

12. Sack-filling equipment, according to claim 11, wherein said two weighing apparatus are arranged to discharge at respective stations spaced from each other by twice the distance between adjacent stations, and selecting means operable to effect alternative operation of said weighing apparatuses responsive to completion of successive steps of rotation of said carousel mechanism.

13. Sack-filling equipment, according to claim 11, comprising a receiving spout disposed below a bag filling spout of a bag filling station of said carousel mechanism, said receiving spout communicating with a conveyor means for loose bulk material, and connecting means selectively interposable between said bag filling spout and said receiving spout.

14. Sack-filling equipment, according to claim 1, comprising in combination, further silo facilities in addition to said silo compartments; and conveyor means connecting said further silo facilities with said silo compartments and selectively operable to feed material from said further silo facilities to said silo compartments.

15. Sack-filling equipment, according to claim 1, in which each of said feeding mechanisms comprises a rotatable feeding worm.

16. Sack-filling equipment, according to claim 15, in which each of said feeding mechanisms includes a cylindrical casing having a substantially sealing fit with the periphery of the associated feeding worm.

References Cited

UNITED STATES PATENTS

| | | | |
|---|---|---|---|
| 3,097,459 | 7/1963 | Rausch | 53—59 |
| 3,152,622 | 10/1964 | Rothermel | 141—83 |

TRAVIS S. McGEHEE, Primary Examiner

U.S. Cl. X.R.

53—59, 64, 124, 131, 188; 141—83